United States Patent
Hayakawa

(10) Patent No.: US 10,899,365 B2
(45) Date of Patent: Jan. 26, 2021

(54) PARKING SUPPORT INFORMATION DISPLAY METHOD AND PARKING SUPPORT DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 444 days.

(21) Appl. No.: 15/769,011

(22) PCT Filed: Oct. 22, 2015

(86) PCT No.: PCT/JP2015/079891
§ 371 (c)(1),
(2) Date: Apr. 17, 2018

(87) PCT Pub. No.: WO2017/068697
PCT Pub. Date: Apr. 27, 2017

(65) Prior Publication Data
US 2019/0054927 A1    Feb. 21, 2019

(51) Int. Cl.
| G06F 7/00 | (2006.01) |
| B60W 50/14 | (2020.01) |
| B60W 30/06 | (2006.01) |
| B62D 15/02 | (2006.01) |
| G08G 1/14 | (2006.01) |
| B60R 21/00 | (2006.01) |

(52) U.S. Cl.
CPC ............. *B60W 50/14* (2013.01); *B60R 21/00* (2013.01); *B60W 30/06* (2013.01); *B62D 15/027* (2013.01); *B62D 15/0285* (2013.01); *G08G 1/14* (2013.01); *G08G 1/143* (2013.01); *B60W 2050/146* (2013.01); *B60W 2554/00* (2020.02)

(58) Field of Classification Search
CPC ....... B60W 50/14; B60W 30/06; B60R 21/00; B62D 15/027; B62D 15/0285
See application file for complete search history.

(56) References Cited

U.S. PATENT DOCUMENTS

| 8,825,221 B2* | 9/2014 | Huger | .................. B62D 15/027 701/1 |
| 2014/0309789 A1* | 10/2014 | Ricci | ....................... G06F 3/017 700/276 |

FOREIGN PATENT DOCUMENTS

| EP | 1862376 A2 | 12/2007 |
| JP | 2002-243471 A | 8/2002 |
| JP | 2008-096362 A | 4/2008 |
| JP | 2009205191 A | 9/2009 |

(Continued)

*Primary Examiner* — Adam M Alharbi
(74) *Attorney, Agent, or Firm* — Young Basile Hanlon & MacFarlane, P.C.

(57) ABSTRACT

A method of displaying parking assist information is used in a parking assist apparatus comprising a display and a control device. The control device displays a first parking space in a first display form on the display. The first parking space satisfies a parking condition that is preliminarily defined. When it is estimated that the first parking space will not satisfy the parking condition or a second parking space other than the first parking space will satisfy the parking condition, the control device displays the first parking space in a second display form different from the first display form on the display.

14 Claims, 15 Drawing Sheets

(56) References Cited

FOREIGN PATENT DOCUMENTS

JP      2011-058229 A    3/2011
JP      2011-179854 A    9/2011

* cited by examiner

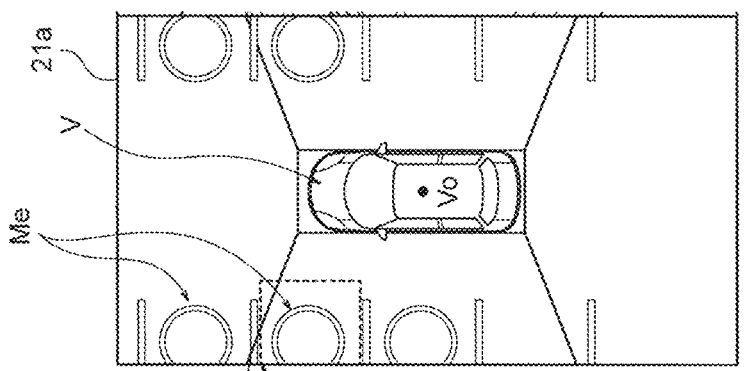
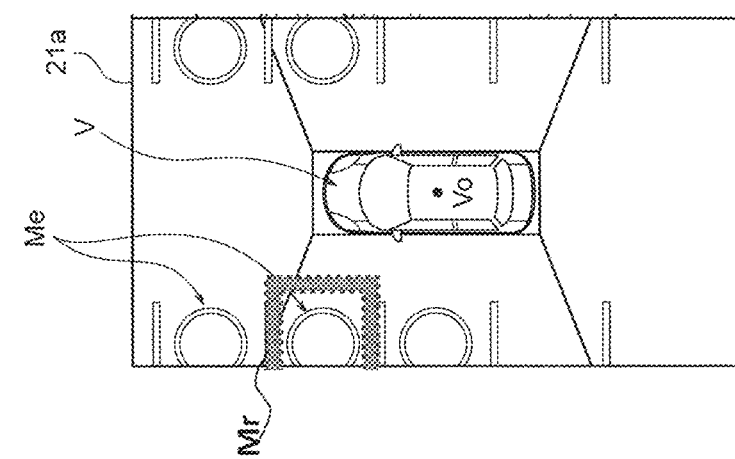
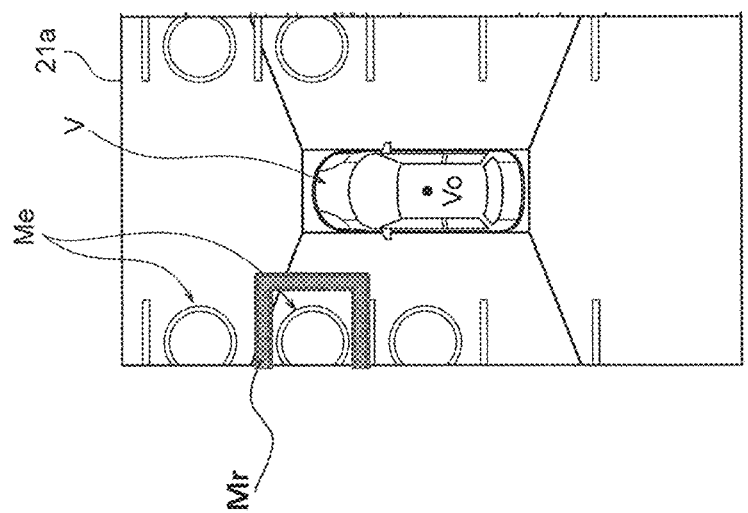
FIG. 9A
FIG. 9B

PARKING SUPPORT INFORMATION DISPLAY METHOD AND PARKING SUPPORT DEVICE

TECHNICAL FIELD

The present invention relates to a method of displaying parking assist information and a parking assist apparatus.

BACKGROUND

With regard to this kind of technique, a technique is known which includes detecting a space into which a subject vehicle can be parked and presenting an available parking space to the user in accordance with a priority level obtained using preregistered unique information of the subject vehicle and the driver (see Japanese Patent Application Publication No. JP2009-205191A).

Japanese Patent Application Publication No. JP2009-205191A, however, does not disclose a method of display when the parking space to be presented to the driver is changed. It is therefore problematic that the display of the parking space may be suddenly changed as the subject vehicle moves.

A problem to be solved by the present invention is to prevent the display of a parking space from being suddenly changed as the subject vehicle moves.

SUMMARY

The present invention solves the above problem through displaying a first parking space that satisfies a parking condition in a first display form on a display and, when it is estimated or detected that the first parking space will not satisfy the parking condition or a second parking space other than the first parking space will satisfy the parking condition, displaying the first parking space in a second display form different from the first display form.

According to the present invention, when it is estimated or detected that the parking space suitable for parking will be changed, the display form is changed and the driver can therefore be notified of the change of the parking space suitable for parking. As a consequence, it is possible to ensure a time for determining the parking space.

BRIEF DESCRIPTION OF THE DRAWINGS

FIGS. 9A and 9B illustrate an example of a first display form and a second display form, respectively.

DETAILED DESCRIPTION

Hereinafter, one or more embodiments of the present invention will be described with reference to the drawings. In the embodiments, the present invention will be described by exemplifying an example in which a parking assist apparatus according to the present invention is applied to a parking assist system equipped in a vehicle. The parking assist apparatus may be applied to a portable terminal device (equipment such as smartphone and PDA) capable of exchanging information with onboard devices. The method of displaying parking assist information according to the present invention can be used in the parking assist apparatus. Parking assist information relating to the invention of this displaying method is specifically displayed using a display 21.

Parking assist apparatus 100 according to one or more embodiments of the present invention may also be a semi-automated type in which the steering operation is automatically performed while the driver performs the accelerator/brake operation. In addition or alternatively, the parking assist apparatus 100 according to one or more embodiments of the present invention may be a remote-control type in which a vehicle with no driver therein is parked into a predetermined parking space by controlling the movement of the vehicle from the outside operator.

Figure 1:
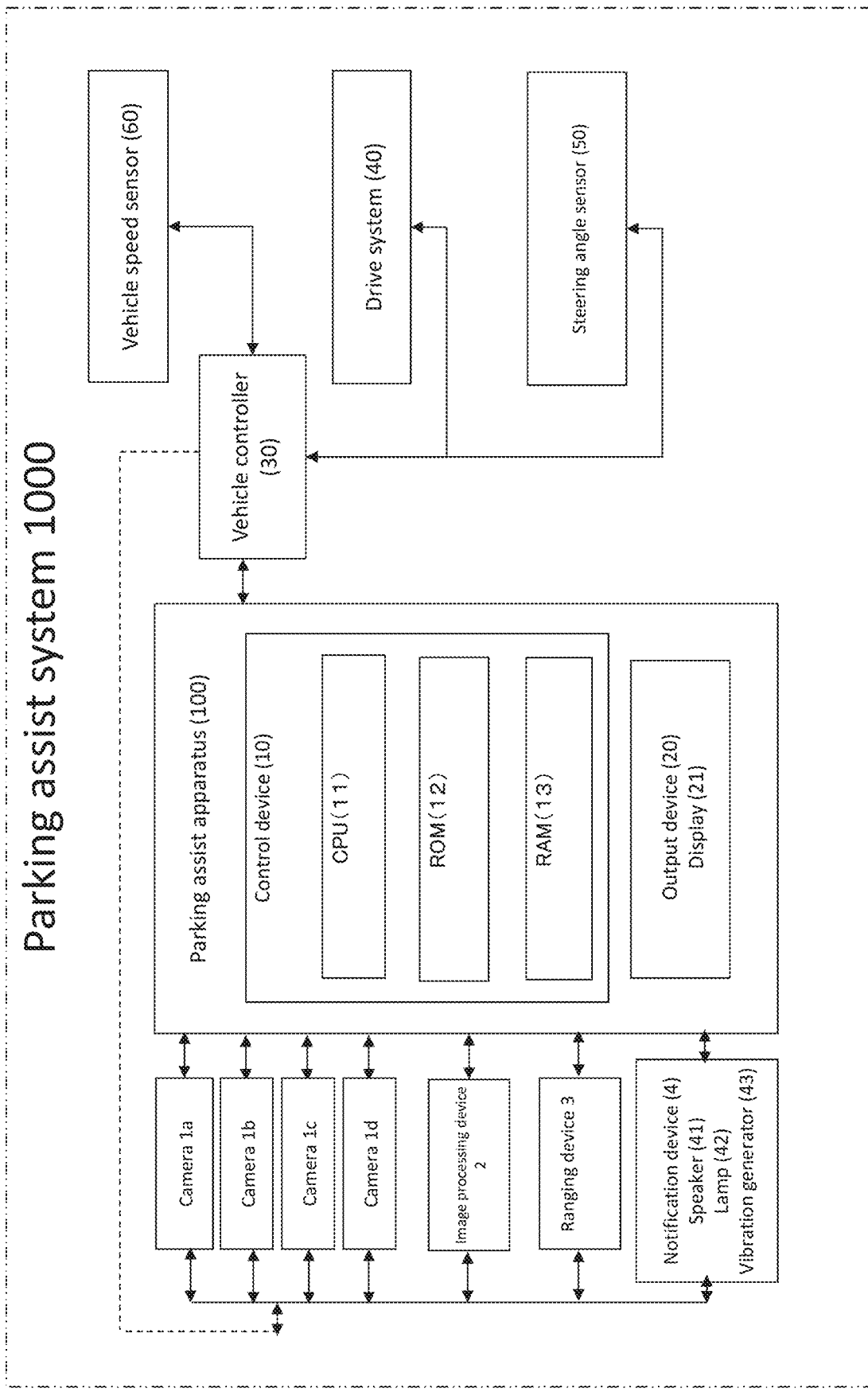
FIG. 1 is a block diagram illustrating an example of a parking assist system according to one or more embodiments of the present invention.

FIG. 1 is a block diagram of a parking assist system 1000 having the parking assist apparatus 100 according to one or more embodiments of the present invention. The parking assist system 1000 according to one or more embodiments of the present invention assists an operation of moving (parking) a subject vehicle into a parking space. The parking assist system 1000 includes cameras 1a to 1d, an image processing device 2, a ranging device 3, a notification device 4, the parking assist apparatus 100, a vehicle controller 30, a drive system 40, a steering angle sensor 50, and a vehicle speed sensor 60. The parking assist apparatus 100 includes a control device 10 and an output device 20.

The output device 20 includes a display 21. The notification device 4 includes a speaker 41, a lamp 42, and a vibration generator 43. These components are connected to one another via a controller area network (CAN) or other in-vehicle LAN to mutually exchange information. The output device 20 informs the driver of parking assist information. The display 21 notifies the driver of the parking assist information in accordance with the content of text, the content of a display image, and/or the form of a display image. The display 21 according to one or more embodiments of the present invention is a touch panel type display having an input function and an output function. The speaker 41 notifies the driver of the parking assist information in accordance with the content of text, the content of voice or sound, and/or the form of voice or sound. The lamp 42 notifies the driver of the parking assist information in accordance with the presence or absence of blinking and/or the blinking form. The vibration generator 43, which is provided at the steering, the seating surface of the driver seat, or a site to be in contact with the driver, transmits the parking assist information in accordance with the generated vibration to the driver. The vibration generator 43 notifies the driver of the parking assist information in accordance with the vibration form, such as the presence or absence of vibration and the vibration period.

The control device 10 of the parking assist apparatus 100 according to one or more embodiments of the present invention is a specific computer comprising a ROM 12 that stores a parking assist program, a CPU as an operation circuit that executes the program stored in the ROM 12 to serve as the parking assist apparatus 100 according to one or more embodiments of the present invention, and a RAM 13 that serves as an accessible storage device. The parking assist program includes a program of a display process for the parking assist information.

The parking assist program according to one or more embodiments of the present invention is a program for execution of a control procedure of presenting the parking assist information, which includes information on available parking spaces, on the display 21 and assisting an operation to park the subject vehicle V into a parking space set by the driver. In the parking assist program according to one or more embodiments of the present invention, the parking space for parking may be automatically set.

The parking assist apparatus 100 according to one or more embodiments of the present invention can be applied to an automated parking system with which a vehicle is automatically parked through operations of the steering, accelerator, and brake and can also be applied to a semiautomated parking system with which a part of operations of the steering, accelerator, and brake is manually performed and other operations are automatically performed. In another embodiment of the present invention, the parking assist apparatus 100 can be applied to a system that assists parking through presenting a route to the parking space and guiding the subject vehicle to the parking space.

The control device 10 of the parking assist apparatus 100 according to one or more embodiments of the present invention has functions of executing an information acquisition process, an available parking space detection process, a recommended parking space detection process, a display control process, and a parking control process. Each of the above processes is executed by cooperation of software for implementing the process and the above-described hardware.

Figure 2:
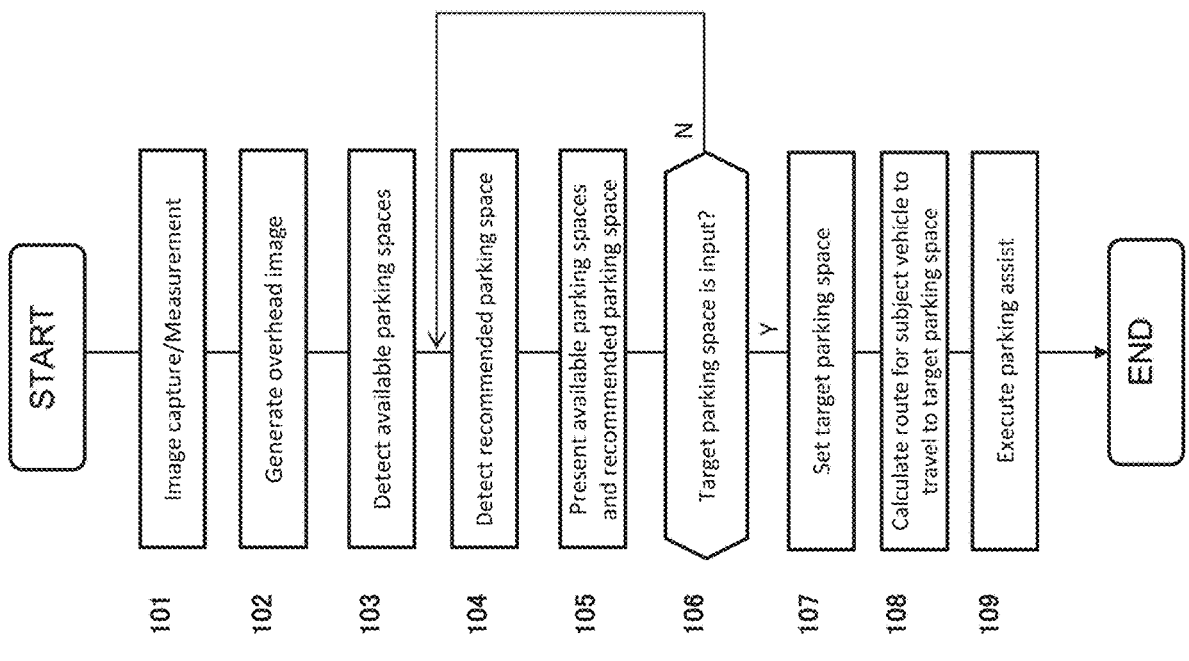
FIG. 2 is a flowchart illustrating an example of a control procedure in the parking assist system according to one or more embodiments of the present invention.

FIG. 2 is a flowchart illustrating a control procedure of the parking assist process executed by the parking assist system 1000 according to one or more embodiments of the present invention. The trigger for starting the parking assist process is not particularly limited, and the parking assist process may be triggered by the operation of a start switch of the parking assist apparatus 100.

The parking assist apparatus 100 according to one or more embodiments of the present invention has a function for automatically moving the subject vehicle V to the parking space. In this process according to one or more embodiments of the present invention, a switch such as a deadman switch is used which is turned on only while being pressed. In the parking assist apparatus 100, when the Deadman switch is pressed, the automated driving of the subject vehicle V is executed, and when the pressing of the Deadman switch is released, the automated driving of the subject vehicle V is suspended. The input device according to one or more embodiments of the present invention can be disposed as an onboard device in the vehicle compartment. In addition or alternatively, the input device may be configured as a portable device that can be carried outside the vehicle compartment so that the subject vehicle V can be controlled by the outside operator.

In step 101, the control device 10 of the parking assist apparatus 100 according to one or more embodiments of the present invention acquires images captured by the cameras 1a to 1d attached to multiple sites of the subject vehicle V. The cameras 1a to 1d capture images of boundary lines of parking spaces around the subject vehicle V and objects existing around the parking spaces. The cameras 1a to 1d may be CCD cameras, infrared cameras, or other appropriate imaging devices. The ranging device 3 may be provided at the same position as any of the cameras 1a to 1d or may also be provided at a different position. The ranging device 3 may be a radar device, such as a millimeter-wave radar, laser radar and ultrasonic radar, or a sonar. The ranging device 3 detects the presence or absence of objects, positions of the objects, and distances to the objects on the basis of the received signal of the radar device. Such objects include obstacles, pedestrian, and other vehicles around the vehicle. The received signal is used to determine whether or not the parking space is empty (whether or not a vehicle is parked in the parking space). Obstacles may be detected using the motion stereo technique by the cameras 1a to 1d.

Figure 3:
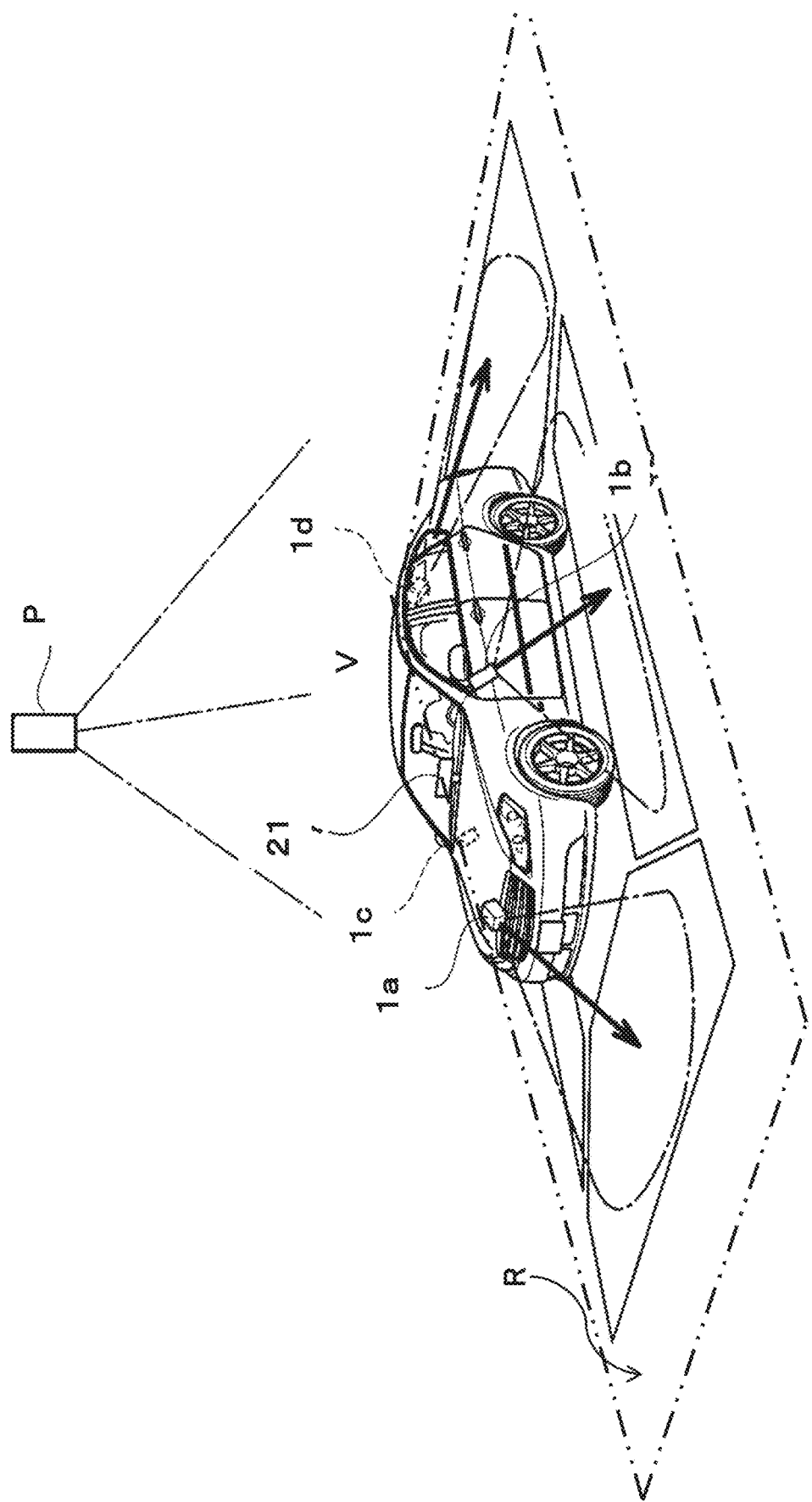
FIG. 3 is a view illustrating an example of positions at which onboard cameras are arranged according to one or more embodiments of the present invention.

FIG. 3 is a view illustrating an exemplary arrangement of the cameras 1a to 1d disposed on the subject vehicle V. In the example illustrated in FIG. 3, the camera 1a is disposed on the front grille part of the subject vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle.

In step 101, the control device 10 also acquires ranging signals from the ranging device 3, which may be a plurality of modules attached to multiple sites of the subject vehicle V.

Figure 7A:
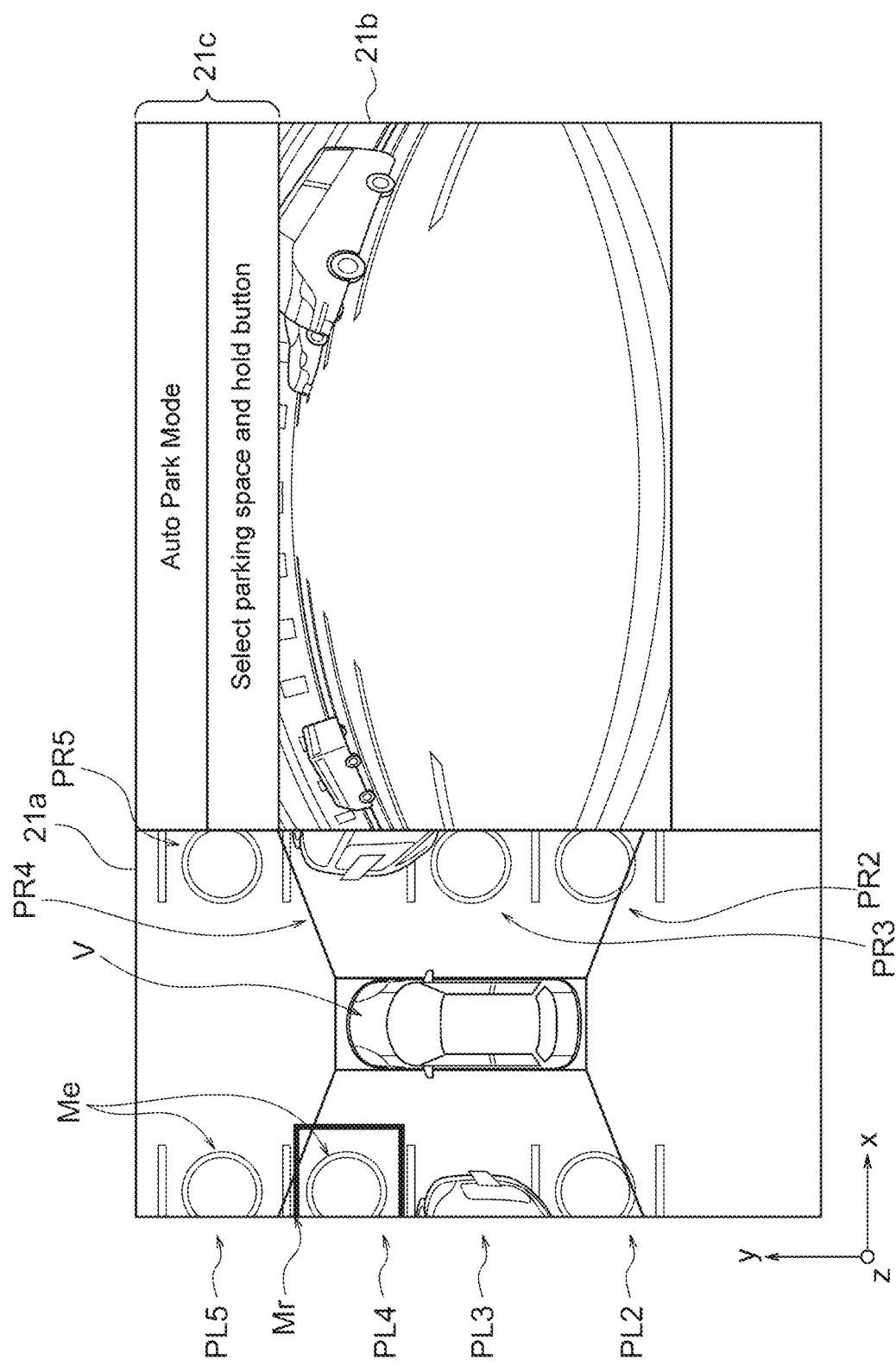
FIG. 7A is a first view illustrating an example of parking assist information presented in the parking assist process according to one or more embodiments of the present invention.
Figure 7B:
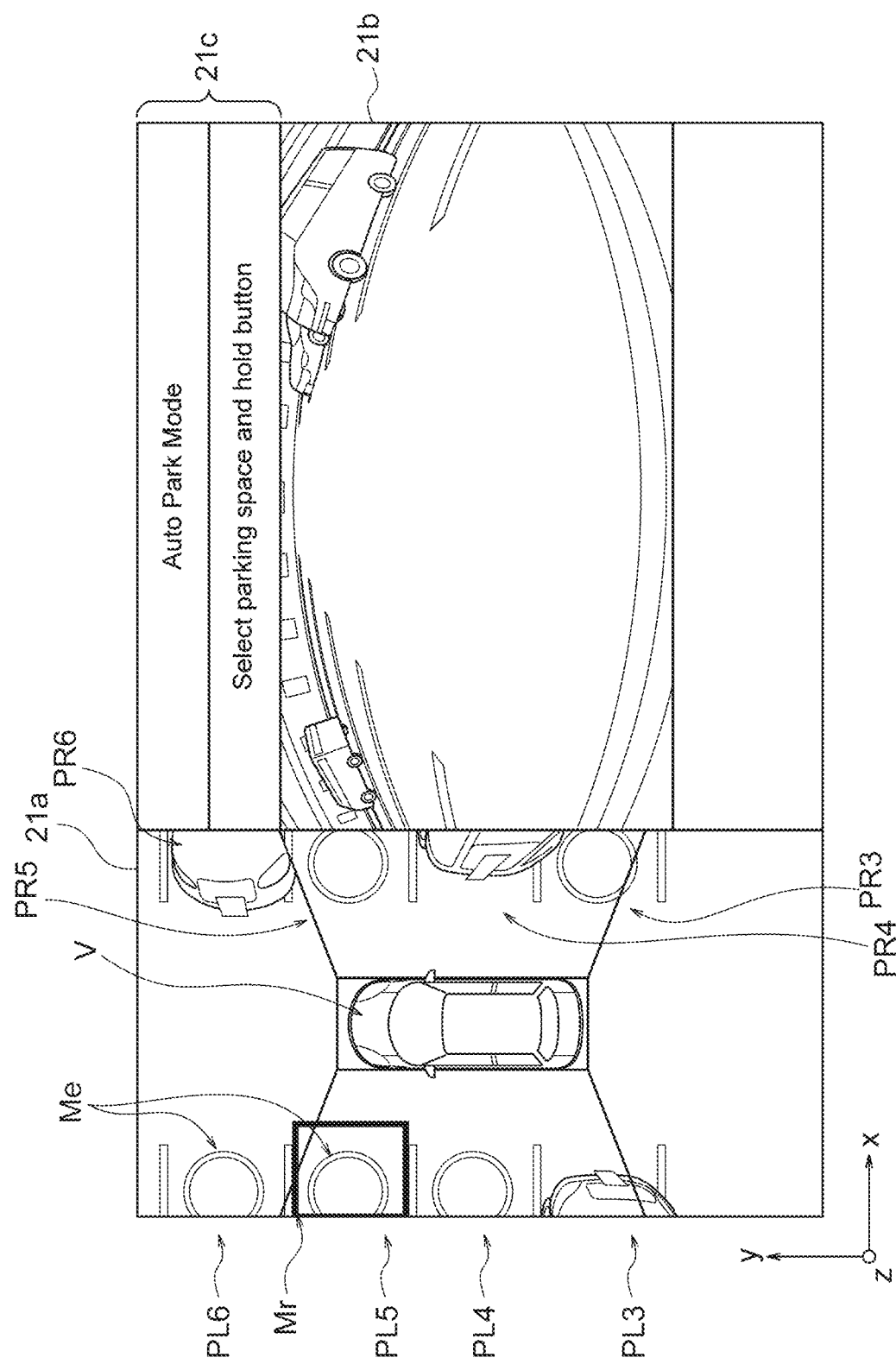
FIG. 7B is a second view illustrating an example of parking assist information presented in the parking assist process according to one or more embodiments of the present invention.

In step 102, the control device 10 of the parking assist apparatus 100 controls the image processing device 2 to generate an overhead image. On the basis of the acquired plurality of captured images, the image processing device 2 generates an overhead image in which the surrounding state including the subject vehicle V and the parking space for the subject vehicle V to park is viewed from a virtual viewpoint P (see FIG. 3) above the subject vehicle V. The image processing performed by the image processing device 2 may be conducted, for example, using a method as disclosed in "Development of Around View System, Proceedings of Society of JSAE Annual Congress, 116-07 (October 2007), pp. 17-22, SUZUKI Masayasu, CHINOMI Satoshi, TAKANO Teruhisa." Examples of a generated overhead image 21a are illustrated in FIGS. 7A and 7B, which will be described later. These figures each illustrate a display example that simultaneously displays the overhead image (top view) 21a around the subject vehicle V and a monitoring image (normal view) 21b around the subject vehicle V.

Referring again to FIG. 2, in steps 103 and 104, the control device 10 detects parking spaces on the basis of a "parking condition" that is preliminarily defined. In one or more embodiments of the present invention, an exemplary case will be described in which the process of specifying available parking spaces and a recommended parking space is a process of detecting the available parking spaces and the recommended parking space. In one or more embodiments of the present invention, the parking assist apparatus 100 detects parking spaces that satisfy the "parking condition," thereby to specify the "available parking spaces" and the "recommended parking space(s)." Processes of specifying the "available parking spaces" and the "recommended parking space(s)" are not limited to those with a detection process, and the "available parking spaces" and "recommended parking space(s)" to be processed may be specified using identification information of the "available parking spaces" and "recommended parking space(s)" which are detected by an external device.

The "parking condition" according to one or more embodiments of the present invention will be described.

The "parking condition" includes a "parking possible condition" for detecting available parking spaces into which parking is possible and "parking recommendation condition" for narrowing down the available parking spaces to a recommended parking space into which parking is recommended for the subject vehicle V. Each condition described below may be employed alone as the "parking condition," or a combination of two or more of conditions may also be employed as the "parking condition."

The parking condition according to one or more embodiments of the present invention includes the following items:
1. Detection condition for parking frame lines;
2. Detection condition for parking spaces;
3. Parking possible condition; and
4. Parking recommendation condition.

The "detection condition for parking frame lines" is a condition for detecting a diagram that represents parking spaces from captured images of a road surface. The "detection condition for parking spaces" is a condition for detecting parking spaces from the diagram of a road surface. The "parking possible condition" is a condition for detecting available parking spaces into which parking is possible. The "parking recommendation condition" is a condition for narrowing down the available parking spaces to a recommended parking space into which parking is recommended for the subject vehicle V. The above items 1 to 3 belong to the parking possible condition according to one or more embodiments of the present invention, and the item 4 belongs to the parking recommendation condition. These conditions may each be employed alone as the "parking condition," or a combination of two or more of these conditions may also be employed as the "parking condition."

In step 103, the control device 10 detects parking frame lines to detect parking spaces on the basis of the images captured by the cameras 1a to 1d and/or the data received by the ranging device 3 and uses these information items to detect available parking spaces Me. In one or more embodiments of the present invention, the available parking spaces are detected from the images captured by the cameras 1a to 1d, but the process of detecting the available parking spaces is not particularly limited. In an alternative embodiment, information may be acquired from an external server to detect or specify the available parking spaces.

A method of detecting the available parking spaces Me will be described below. The control device 10 determines whether or not the subject vehicle V is traveling in an area that includes parking spaces (such an area will also be referred to as a "parking area," hereinafter), on the basis of the vehicle speed of the subject vehicle V. For example, when the vehicle speed of the subject vehicle V is a predetermined vehicle speed threshold or less and this state continues for a predetermined time or more, the control device 10 determines that the subject vehicle V is traveling in a parking area. The control device 10 determines whether or not the subject vehicle V is traveling in a parking area, on the basis of an attribute of the positional information of a navigation system (not illustrated) (information that the point is included in a parking lot). When the detected positional information has an attribute that represents a parking area such as an area including parking spaces of a highway, for example, a determination is made that the subject vehicle V is traveling in the parking area. In one or more embodiments of the present invention, a determination may be made as to whether or not the detected area is an area including parking spaces, on the basis of information obtained from a device located outside the vehicle via road-to-vehicle communication or vehicle-to-vehicle communication.

When a determination is made that the subject vehicle V is traveling in a parking area, the control device 10 detects white lines on the basis of the captured images acquired for generation of an overhead image. White lines represent boundary lines that define frames (regions) of parking spaces. The control device 10 performs edge detection on the captured images to calculate a luminance difference (contrast). The control device 10 specifies a pixel line having a luminance difference of a predetermined value or more from the overhead image and calculates the width and length of the line. In one or more embodiments of the present invention, frame lines representing parking spaces may not necessarily be white, and other colors such as red may also be employed.

The control device 10 detects lines that satisfy the following condition "1. Detection condition for parking frame lines" as parking frame lines. In one or more embodiments of the present invention, a diagram that satisfies all of (1) to (6) is detected as representing parking frame lines. In an alternative embodiment, any one or more of (1) to (6) may be selected and applied.

1. Detection Condition for Parking Frame Lines
(1) The luminance difference of edges is a predetermined threshold or more.
(2) The angle of a line is a predetermined threshold or less.
(3) The width of a line is a predetermined threshold or less.
(4) The length of a continuous edge (line) is a predetermined value or more.
(5) The luminance difference of noise between lines is less than a predetermined threshold.
(6) The likelihood representing the probability as parking frame lines calculated based on the assessment/evaluation values of the above (1) to (5) is a predetermined value or more.

The control device 10 detects parking spaces from candidates of the detected parking frame lines using a known image processing technique such as pattern matching. Specifically, the control device 10 detects parking frame lines that satisfy the following condition "2. Detection condition for parking spaces," as parking spaces. In one or more embodiments of the present invention, parking frame lines that satisfy all of (1) to (3) are detected as parking spaces. Any one or more of the conditions (1) to (3) may also be selected and applied. The control device 10 has been described as detecting parking spaces from candidates of the detected parking frame lines using a known image processing technique such as pattern matching, but one or more embodiments of the present invention are not limited to this, and parking spaces may be directly detected without detecting parking frame lines. For example, empty spaces having a predetermined range (size) may be detected as parking spaces, or locations at which parking maneuvers were executed in past times may be detected as parking spaces. If a condition that is preliminarily set to define the probability of being parking spaces is satisfied, the parking spaces can be directly detected without detecting parking frame lines.

2. Detection Condition for Parking Spaces (1) Lines extracted as candidates of parking frame lines do not include a line having a length equal to or larger than a first threshold that is preliminarily set (e.g. a length corresponding to an actual distance of 15 [m]).

(2) Lines extracted as candidates of parking frame lines do not include a line having a length equal to or smaller than a second threshold that is preliminarily set (e.g. a length corresponding to an actual distance of 3 to 5 [m]), and a pair of approximately parallel lines does not include a line having a length equal to or larger than a third threshold that is preliminarily set (e.g. a length corresponding to an actual distance of 7 [m]).

(3) Lines extracted as candidates of parking frame lines do not include a line having a length equal to or smaller than a fourth threshold that is preliminarily set (e.g. a length corresponding to an actual distance of 2.5 to 5 [m]), and a pair of approximately parallel lines does not include a line having a length equal to or larger than a fourth threshold that is preliminarily set (e.g. a length corresponding to an actual distance of 15 [m]).

Positional information of parking spaces may be stored so as to be included in map information of a navigation system or may also be acquired from an external server or a management device of facilities (parking lots).

The control device 10 stores the "parking possible condition" for extracting the available parking spaces Me. The "parking possible condition" is defined from the viewpoint of extracting parking spaces into which parking is possible. The "parking possible condition" is preferably defined from the viewpoint of the distance from the subject vehicle V, the viewpoint as to whether or not other vehicles are parked, and the viewpoint of presence or absence of obstacles. On the basis of the "parking possible condition," the control device 10 detects the available parking spaces Me into which the subject vehicle V can be parked. The available parking spaces Me are parking spaces into which the subject vehicle V can be parked.

Figure 4A:
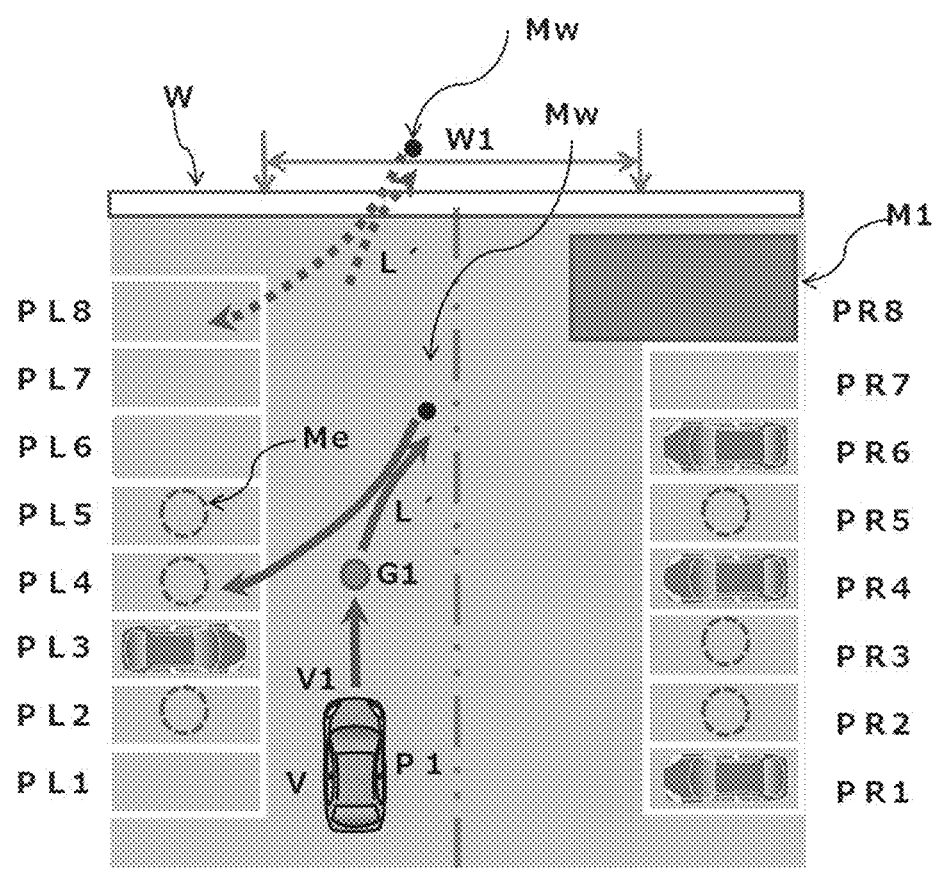
FIG. 4A is a first view for describing an example of a parking assist process according to one or more embodiments of the present invention.

FIG. 4A is a first diagram illustrating an example of the parking assist process according to one or more embodiments of the present invention. In FIG. 4A, the position of the subject vehicle V traveling is P1 and the vehicle speed is V1. The control device 10 detects parking spaces into which the subject vehicle V moving in the direction of the arrow (indicated ahead of the subject vehicle V) can be parked. The reference point for determining the position of the subject vehicle V can be arbitrarily defined. The reference point may be defined as the position of the center of gravity V0 of the subject vehicle V, the position of the front bumper of the subject vehicle V, or the position of the rear bumper of the subject vehicle V.

After detecting the parking spaces, the control device 10 first detects empty parking spaces using the detection data from the ranging device 3/image processing device 2.

3. Parking Possible Condition

The "parking possible condition" according to one or more embodiments of the present invention is defined from the viewpoint of extracting parking spaces into which the subject vehicle V can be parked.

(1) The distance is within a predetermined distance from the subject vehicle V.

(2) The parking space is empty.

(3) No obstacles are present.

The control device 10 determines whether or not obstacles are present in the parking spaces. In the parking area illustrated in FIG. 4A, the control device 10 does not detect parking spaces PR1, PR4, PR6, and PL3 as the available parking spaces Me because other vehicles are parked therein. Similarly, the control device 10 does not detect a parking space PR8 as the available parking space Me because an obstacle M1 is present therein.

The control device 10 detects a parking space to which the subject vehicle V can move. When a route for the subject vehicle V to move to a parking space can be derived, the control device 10 determines that the subject vehicle V can be parked into the parking space. FIG. 4A illustrates a route L when the subject vehicle V is parked by automated driving. The route L is a route on which the subject vehicle V moves from the current position to an intermediate position Mw located ahead of the subject vehicle V and reverses to complete the parking maneuver into a parking space PL. Such parking maneuver includes one or more turns for parking. Parking spaces to which the routes on the road surface cannot be obtained due to existence of obstacles such as a wall are not detected as the parking spaces into which parking is possible. For example, the route (represented by arrows L of broken lines) to a parking space PL8 cannot be obtained because the wall W is an obstacle. The control device 10 therefore does not detect the parking space PL8 as the available parking space Me.

Although not particularly limited, in the position P1 of the subject vehicle V, the control device 10 detects parking spaces that are located ahead of a reference position of the subject vehicle V and belong to a range of a predetermined distance from the subject vehicle V, as available parking spaces. The reference position of the subject vehicle V can be freely set. Although not particularly limited, in FIG. 4A, parking spaces PL2 to PL5 and PR2 to PR5 belong to the range of detection of the available parking spaces Me. The control device 10 can be configured so as not to detect a parking space PL1 as the available parking space Me because the parking space PL1 will be located behind the subject vehicle V within a certain time. The range of detection can be expanded in accordance with the performance of the cameras 1a to 1d and ranging device 3. Although not particularly limited, the parking assist apparatus 100 according to one or more embodiments of the present invention presents the parking information regarding this range of detection to the driver. As will be understood, the detection range is not limited to the range of parking spaces PL2 to PL5 and PR2 to PR5 and may also be, for example, the range of parking spaces PL1 to PL8 and PR1 to PR8. The range of detection may be limited to a range that includes the parking spaces PR1 to PR8 on the right side of the subject vehicle V and may also be limited to a range that includes the parking space PL1 to PL8 on the left side of the subject vehicle V.

Although not particularly limited, the control device 10 according to one or more embodiments of the present invention detects those, among parking spaces, which are empty (no other vehicles are parked) and belong to a predetermined range of detection and for which routes L can be derived, as the available parking spaces Me. The situation that routes L can be derived refers to a condition that the trajectories of routes L can be rendered on a coordinate system of the road surface without interfering with obstacles (including parked vehicles).

In the example illustrated in FIG. 4A, the control device 10 detects the parking spaces PL2, PL4, PL5, PR2, PR3, and PR5 as the available parking spaces Me within the range of detection. The detected available parking spaces Me are each displayed with a broken line circle Me which is a parking available mark.

Subsequently, the routine proceeds to step 104 in which the control device 10 detects a recommended parking space Mr in accordance with the following parking recommendation condition. The "parking recommendation condition" will be described below.

4. Parking Recommendation Condition

The "parking recommendation condition" according to one or more embodiments of the present invention is defined from the viewpoint of extracting a parking space with which the cost required for parking (also referred to as a "parking-related cost," here and hereinafter) is low.

(1) The number of turns for parking is a predetermined number or less.
(2) The time required for parking is a predetermined time or less.
(3) The travel distance required for parking is a predetermined distance or less.

The control device 10 detects the recommended parking space Mr in accordance with the traveling state of the subject vehicle V from among the detected plurality of available parking spaces. The control device 10 stores the "parking recommendation condition" for extracting the recommended parking space Mr. The "parking recommendation condition" is defined from the viewpoint of extracting a parking space with which the parking-related cost is low. The "parking recommendation condition" is preferably defined from the viewpoints of the number of turns for parking, the time required for parking, and the travel distance required for parking. On the basis of the "parking recommendation condition," the control device 10 extracts the recommended parking space Mr, with which the parking-related cost is low, from among the available parking spaces.

A method of detecting the recommended parking space Mr will be described below. The control device 10 calculates the parking-related cost for parking into each available parking space. The parking-related cost includes those relating to the time required for parking, the number of operations required for parking (such as the number of steering operations and the number of brake/accelerator operations), and the travel distance required for parking. The control device 10 obtains a route for parking into each available parking space Me and calculates the time required for parking, the number of operations, and the travel distance on the route. The control device 10 calculates the parking-related cost on the basis of the calculation results of each route.

The control device 10 calculates the route when parking the subject vehicle V into each available parking space Me. The route is a trajectory from the position at which the parking assist process is started (start position) to the position at which the subject vehicle V arrives at a parking completion position in each available parking space Me. The control device 10 sets the start position for each available parking space Me. The control device 10 calculates a route from the start position to each available parking space Me. The number of routes for automated driving is not limited to one, and the control device 10 may calculate a plurality of routes in accordance with the surrounding situations.

Costs are different, such as those relating to the number of turns for parking on a route, the length of the route, the time for moving along the route (time for parking), and the maximum steering angle, which are calculated for each available parking space Me. The smaller the number of turns for parking, the shorter the time required for parking (the parking-related cost is small). The shorter the length of the route, the shorter the time required for parking (the parking-related cost is small). The smaller the maximum steering angle, the shorter the time required for parking (the parking-related cost is small). On the other hand, the larger the number of turns for parking, the longer the time required for parking (the parking-related cost is large). The longer the length of the route, the longer the time required for parking (the parking-related cost is large). The larger the maximum steering angle, the longer the time required for parking (the parking-related cost is large).

Description will be made, for example, for an exemplary case in which the subject vehicle V is parked into an available parking space PL6 or PL7 illustrated in FIG. 4A. The distance from the parking space PL7 to the wall W is shorter than the distance from the parking space PL6 to the wall W. The number of turns for parking when parking into the parking space PL7 is larger than the number of turns for parking when parking into the parking space PL6 (the parking-related cost is higher in the former case). The time required for parking into the parking space PL7 is longer than the time required for parking into the parking space PL6 (the parking-related cost is higher in the former case).

The control device 10 calculates the parking-related cost (including the time for parking) of each available parking space and stores the parking-related cost so that it is associated with the identifier of each available parking space. The control device 10 calculates the parking-related cost of each available parking space Me using any one or more of the cost in accordance with the number of turns for parking on the route, the parking-related cost in accordance with the length of the route, the parking-related cost in accordance with the time for moving along the route (time for parking), and the parking-related cost in accordance with the maximum steering angle. Each parking-related cost may be calculated such that weighting is defined in accordance with the type.

Then, a recommended parking space in accordance with a gaze point distance is detected.

The control device 10 calculates the gaze point distance on the basis of the vehicle speed of the subject vehicle V. The gaze point distance refers to a distance from the position of the subject vehicle V to the position (gaze point) which the driver of the subject vehicle V gazes on. The control device 10 detects the parking space corresponding to the position which the driver gazes on, as the recommended parking space.

In general, the higher the vehicle speed, the farther the driver gazes on, and the lower the vehicle speed, the closer the driver gazes on. From the viewpoint of recommending a parking space in accordance with the observing point of the driver, the control device 10 sets a longer gaze point distance as the vehicle speed of the subject vehicle V is higher, and sets a shorter gaze point distance as the vehicle speed is lower. This allows the parking assist into the parking space to be executed in accordance with the intention of the driver. The gaze point distance is not necessarily linear and may also be defined along a curve. The direction of the gaze point distance can be set in accordance with the steering angle of the subject vehicle V.

Figure 5:
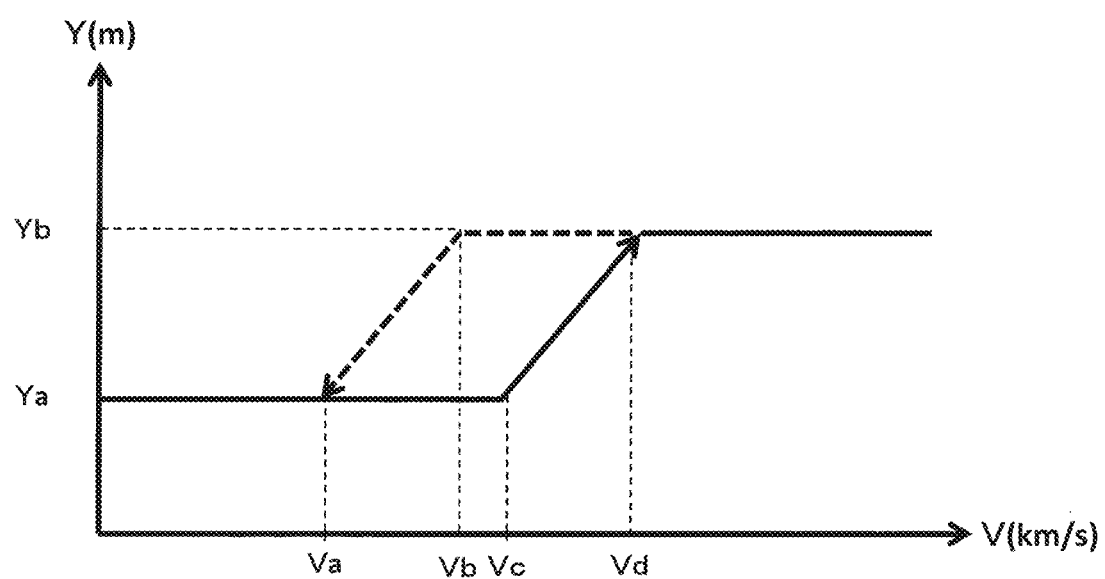
FIG. 5 is a graph illustrating the relationship between a vehicle speed (V [km]) and a gaze point distance (Y [m])

FIG. 5 is a graph illustrating the relationship between the vehicle speed (V [km/s]) and the gaze point distance (Y [m]). The solid line represents the above relationship when the vehicle speed increases while the broken line represents the above relationship when the vehicle speed decreases. As illustrated in FIG. 5, when the vehicle speed is Va or lower, the gaze point distance is Ya. Also when the vehicle speed is Va or higher and Vc or lower, the gaze point distance is Ya. When the vehicle speed is Vc or higher and Vd or lower, the gaze point distance Y increases in proportion to the vehicle speed V. When the vehicle speed is Vd or higher, the gaze point distance is Yb. On the other hand, when the vehicle speed lowers below Vd, the gaze point distance decreases along the broken line of FIG. 5. While the vehicle speed lowers from Vd to Vb, the gaze point distance is Yb. While the vehicle speed lowers from Vb to Va, the gaze point distance Y decreases in proportion to the vehicle speed V. Thus, the relationship between the vehicle speed V and the gaze point distance Y has a hysteresis characteristic between the increasing direction and decreasing direction of the vehicle speed V.

The ROM 12 of the control device 10 stores a map (e.g. the relationship illustrated in FIG. 5) between the vehicle speed V and the gaze point distance Y. The control device 10 acquires the information on the vehicle speed V from the vehicle speed sensor 60 and refers to the map to calculate the gaze point distance Y in accordance with the vehicle speed V. The control device 10 detects a parking space in the vicinity of the gaze point which is separate from the subject vehicle V by the gaze point distance Y (i.e., the parking space is located within a predetermined distance from the gaze point).

If the vehicle speed decreases when the recommended parking space is presented, the gaze point distance of the driver decreases and the gaze point comes close to the subject vehicle V (moves toward the near side of the subject vehicle V). If, in response to this approach of the gaze point, the recommended parking space is changed from a distant one (e.g. the parking space PL5) to a nearby one (e.g. the parking space PL4), the position of the recommended parking space Mr will move in the direction of approaching the subject vehicle V (in the rearward direction) even though the subject vehicle V moves frontward on the screen. Such movement of the recommended parking space Mr is unnatural and may confuse the driver. As illustrated in FIG. 5, the parking assist apparatus 100 according to one or more embodiments of the present invention is designed such that the gaze point distance when the vehicle speed decreases has a hysteresis characteristic. Such a hysteresis characteristic allows the gaze point distance Yd to be maintained even when the vehicle speed decreases. This can prevent unnatural display such that the position of the recommended parking space Mr moves backward in the traveling direction of the subject vehicle V and approaches the subject vehicle V. In the parking assist apparatus 100 according to one or more embodiments of the present invention, the previously-described parking recommendation condition may include the gaze point distance. This enables recommendation of the parking space in accordance with the observing point of the driver.

Figure 4B:
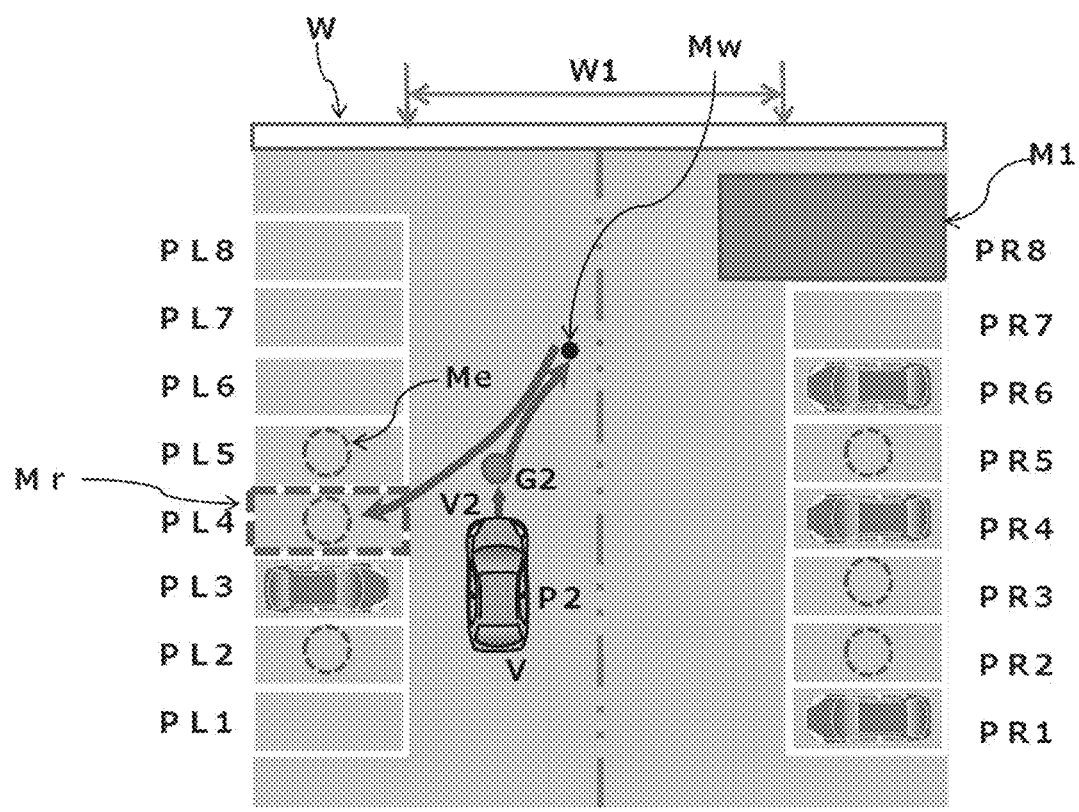
FIG. 4B is a second view for describing an example of the parking assist process according to one or more embodiments of the present invention.

FIG. 4B illustrates a state in which the subject vehicle V moves forward from the position P1 illustrated in FIG. 4A to a position P2. The speed of the subject vehicle V at the position P2 is V2 (<V1). The control device 10 refers to the map to calculate the gaze point distance corresponding to the vehicle speed V2. The control device 10 specifies a point G2 that is separate from the position P2 by the gaze point distance, as a gaze point (G2). The subject vehicle V is in a state of selecting a parking space with the lowered vehicle speed V2 (<V1). The distance between the gaze point G2 and the subject vehicle V is shorter than the distance between the gaze point G1 illustrated in FIG. 4A and the subject vehicle V because the vehicle speed is lowered.

In the state illustrated in FIG. 4B, the control device 10 detects a recommended parking space from among the parking spaces PL2, PL4, PL5, PR2, PR3, and PR5 in the vicinity of the gaze point G2. The control device 10 detects the recommended parking space on the basis of the parking-related cost for each of the parking spaces PL2, PL4, PL5, PR2, PR3, and PR5.

The control device 10 assigns identification numbers to the available parking spaces Me in the vicinity of the gaze point G2. The control device 10 calculates the parking-related cost for parking into each available parking space Me. The control device 10 may read out the parking-related cost for parking which is previously calculated. The parking-related cost for parking into each available parking space Me reflects a load such as a time for parking required for moving the subject vehicle V to the parking space by automated driving, the number of operations, and the moving distance. The parking-related cost for parking is a different index from the difficulty level when the driver completes the parking maneuver. The control device 10 calculates the time required for parking into each available parking space Me. In the example of FIG. 4B, the control device 10 calculates the time required for parking into each of the parking spaces PL2, PL4, PL5, PR2, PR3, and PR5 into which parking is possible, and stores the time required for parking such that it is associated with each identification number.

The control device 10 compares the parking-related cost for parking into each available parking space Me and a predetermined threshold that is preliminarily set. The predetermined threshold is the upper limit threshold of the parking-related cost which includes the time required for parking by automated driving. When the time (parking-related cost) required for parking into an available parking space Me is less than the predetermined threshold, the control device 10 detects the available parking space Me as the recommended parking space Mr. On the other hand, when the time (parking-related cost) required for parking into an available parking space Me is not less than the predetermined threshold, the control device 10 does not detect the available parking space Me as the recommended parking space Mr. An available parking space Me with which the time required for parking is minimum (the parking-related cost is lowest) may be detected as the only recommended parking space Mr.

The control device 10 detects an available parking space Me, among the available parking spaces Me, with which the parking-related cost is lowest, as the recommended parking space Mr. In the example illustrated in FIG. 4B, the parking space PL4 is detected as the recommended parking space Mr because the parking-related cost (the time required for parking) is lower than the predetermined threshold and the gaze point is closest (the parking-related cost is lowest).

Figure 4C:
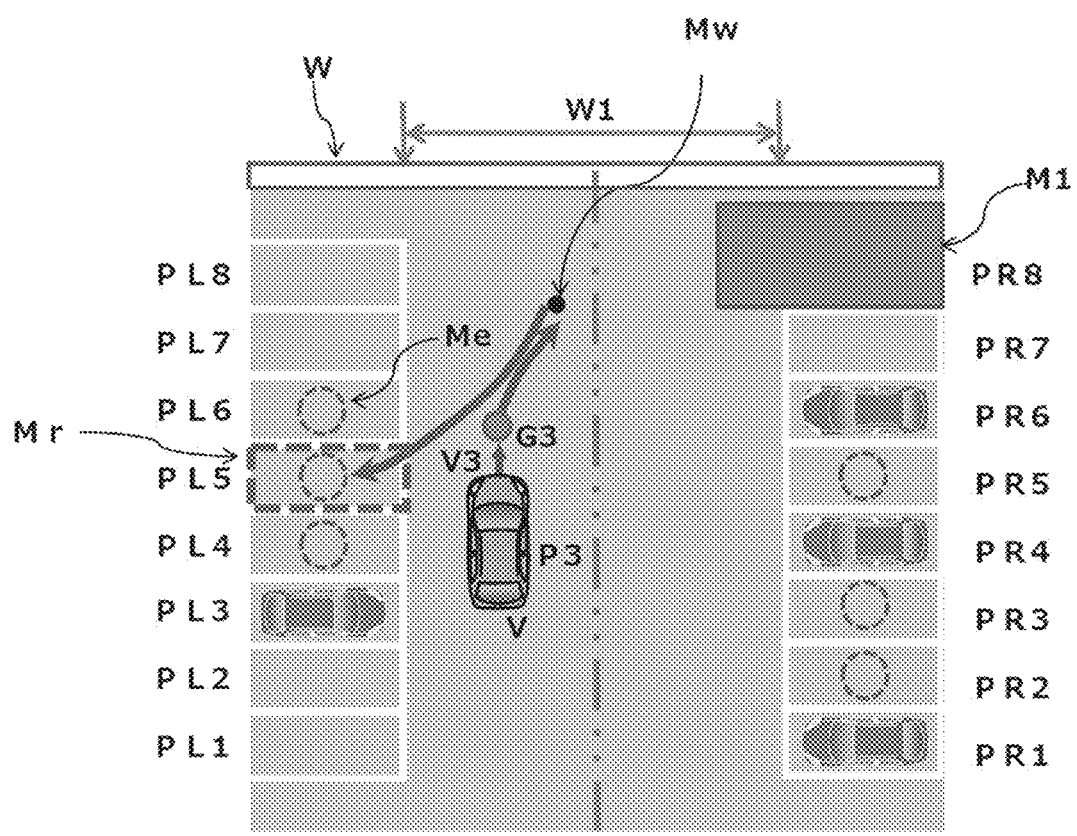
FIG. 4C is a third view for describing an example of the parking assist process according to one or more embodiments of the present invention.

The control device 10 executes the detection process for the recommended parking space Mr at a predetermined period. As illustrated in FIG. 4C, also when the subject vehicle V moves forward to the position P3 at a vehicle speed of V3, the control device 10 detects a new recommended parking space Mr. The control device 10 calculates a new gaze point G3 and the parking-related cost required for moving from the current position to each available parking space Me and detects the parking space PL5, with which the parking-related cost is lowest and into which parking is possible, as the recommended parking space Mr.

In step 105, the control device 10 displays the available parking spaces Me and the recommended parking space Mr on the display 21. The method of displaying the available parking spaces Me and the recommended parking space Mr according to one or more embodiments of the present invention will be described later in detail.

In step 106, a determination is made as to whether or not a target parking space Mo is input. The target parking space Mo refers to a parking space into which the subject vehicle V is parked by automated driving, that is, a target position in automated driving. The target parking space Mo is input by the driver or a passenger. For example, when the display 21 is a touch panel-type display, the driver or a passenger touches a portion representing a desired parking space thereby to specify the target parking space Mo, and information on the target parking space Mo is input to the control device 10. When the target parking space Mo is input in step 106, the control flow proceeds to step 107. On the other hand, when the target parking space Mo is not input, the control flow returns to step 104, and the control flow from step 104 to step 106 is executed.

When the target parking space Mo is input, this parking space is set as the target parking space Mo in step S107.

In step 108, the control device 10 calculates a route for moving the subject vehicle V to the target parking space Mo.

Figure 4D:
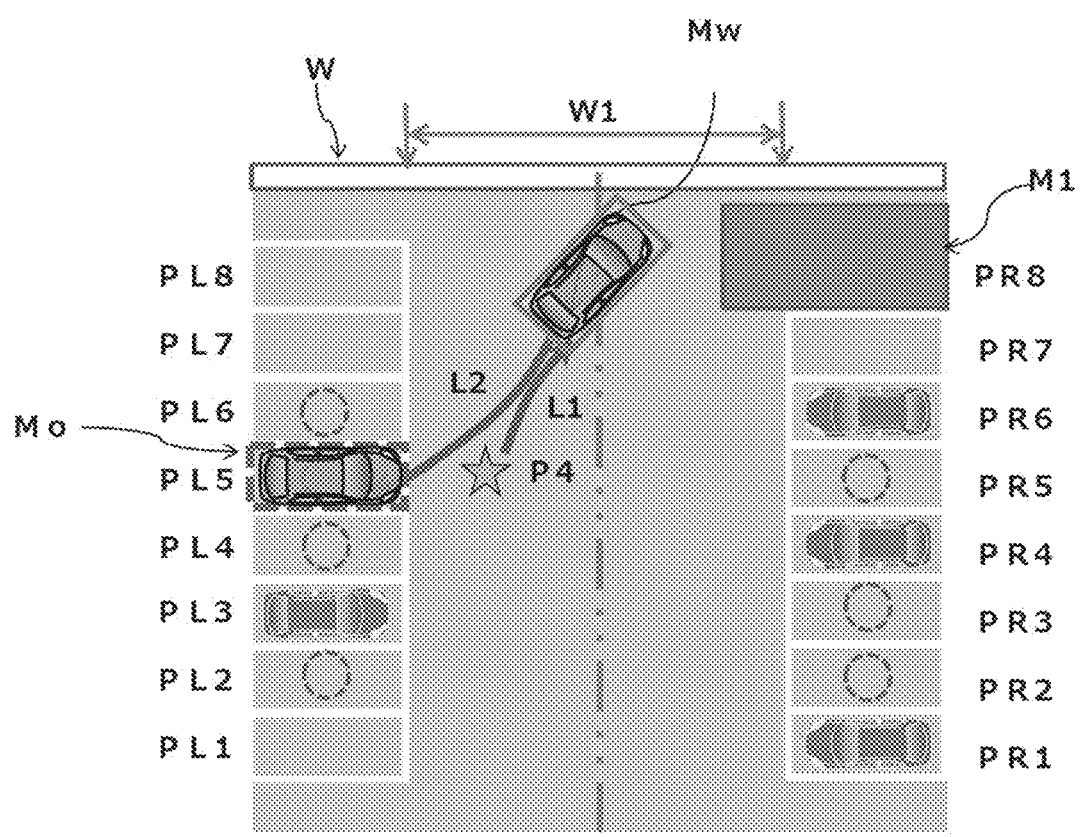
FIG. 4D is a fourth view for describing an example of the parking assist process according to one or more embodiments of the present invention.

FIG. 4D is a view illustrating a scene in which the parking space PL5 is specified as the target parking space Mo. The control device 10 calculates a route for parking on the basis of the positional relationship between the position P4 of the subject vehicle V at which the parking maneuver (movement) is started and the position of the target parking space Mo. Although not particularly limited, the control device 10 calculates the route to include a curve L1 and a curve L2. The curve L1 lies from the stop position of the subject vehicle V, that is, a position at which the parking assist is started, to the intermediate position Mw at which the turn for parking is performed. The curve L2 lies from the intermediate position Mw to the target parking space Mo (PL5).

The control device 10 reads routes corresponding to the selected parking mode and calculates a route on the basis of the positional relationship between the position of the subject vehicle V when starting the automated parking process and the position of the target parking space Mo. When the driver presses the previously-described deadman switch during the operation of the automated parking mode, the control device 10 controls the vehicle controller 30 to execute the process of moving the subject vehicle V to the target parking space Mo on the calculated route.

Figure 6A:
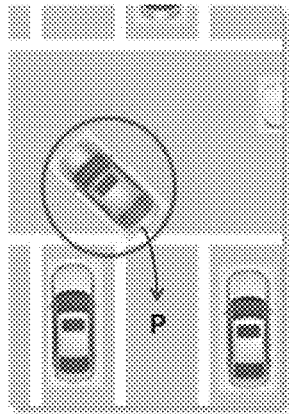
FIGS. 6A-6C are views illustrating examples of parking patterns to which the parking assist process according to one or more embodiments of the present invention is applied.
Figure 6B:
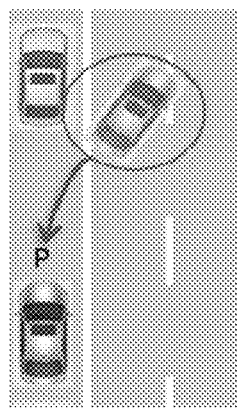
Figure 6C:
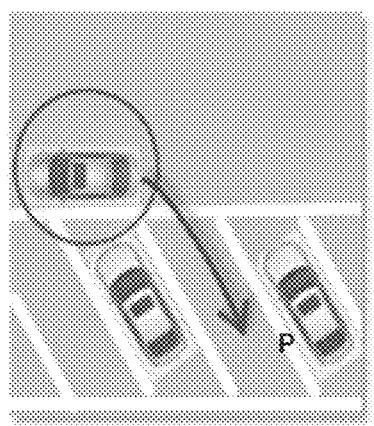

The control device 10 calculates the route corresponding to each of right-angle parking, parallel parking, and oblique parking illustrated in FIGS. 6A-6C. In one or more embodiments of the present invention, the route has been described as being calculated, but the present invention is not limited to this. In an alternative embodiment, a route corresponding to the type of the parking space is stored in a memory (ROM), and the route may be read out when parking. The parking mode (such as right-angle parking, parallel parking, and oblique parking) may be selected by the driver of the subject vehicle V.

In step 109, the parking assist apparatus 100 according to one or more embodiments of the present invention executes the parking assist process or the automated parking process. The parking assist apparatus 100 according to one or more embodiments of the present invention controls the operation of the drive system 40 via the vehicle controller 30 so that the subject vehicle V moves along the route.

The parking assist apparatus 100 calculates command signals to the drive system 40 of the subject vehicle V, such as an EPS motor, while feeding back the output value of the steering angle sensor 50 of the steering apparatus so that the travel trajectory of the subject vehicle V coincides with the calculated route, and sends the command signals to the drive system 40 or to the vehicle controller 30 which controls the drive system 40.

The parking assist apparatus 100 according to one or more embodiments of the present invention includes a parking assist control unit. The parking assist control unit acquires shift range information from an AT/CVT control unit, wheel speed information from an ABS control unit, steering angle information from a steering angle control unit, engine speed information from an ECM, and other necessary information. On the basis thereof, the parking assist control unit calculates and outputs instruction information on the automated steering to the EPS control unit, instruction information such as warning to a meter control unit, etc. The control device 10 acquires information items, which are acquired by the steering angle sensor 50 of the steering apparatus of the subject vehicle V and the vehicle speed sensor 60 and other sensors of the vehicle, via the vehicle controller 30.

The drive system 40 according to one or more embodiments of the present invention allows the subject vehicle V to move (travel) from the current position to the target parking space Mo by driving based on the control command signals acquired from the parking assist apparatus 100. The steering apparatus according to one or more embodiments of the present invention is a drive mechanism that moves the subject vehicle V in the right and left directions. The EPS motor included in the drive system 40 drives the power steering mechanism of the steering of the steering apparatus on the basis of the control command signals acquired from the parking assist apparatus 100 to control the steering amount and assists the operation when moving the subject vehicle V to the target parking space Mo. The content of the parking assist and the process of operation are not particularly limited, and processes known at the time of filing of this application can be appropriately applied.

When the parking assist apparatus 100 according to one or more embodiments of the present invention controls the subject vehicle V to move to the target parking space Mo along the route calculated based on the position P4 of the subject vehicle V and the position of the target parking space Mo, the accelerator and the brake are automatically controlled on the basis of the specified control vehicle speed (set vehicle speed), and the operation of the steering apparatus is also automatically controlled in accordance with the vehicle speed. That is, during the parking assist according to one or more embodiments of the present invention, the steering operation and the accelerator/brake operation are automatically performed.

In addition, it is also possible to perform a parking process by remote control that includes transmitting a setting command for the target parking space Mo, a parking process start command, a parking suspension/cancellation command, etc. to the subject vehicle V with no driver therein from the outside operator.

As will be understood, it is also possible for the driver to operate the accelerator/brake, and only the operation of the steering apparatus is automatically controlled. In this case, the parking assist apparatus 100 controls the drive system 40 on the basis of the set vehicle speed which is preliminarily calculated so that the subject vehicle V follows the route to move, and controls the steering apparatus of the subject vehicle V on the basis of the set steering angle which is also preliminarily calculated. Furthermore, the parking assist apparatus 100 according to one or more embodiments of the present invention is also applicable to manual parking in which the driver performs operation of the accelerator, brake and steering.

Thus, the parking assist apparatus 100 has an automated travel mode that does not require the operation by the driver and a manual operation mode that requires the operation by the driver. The automated travel mode includes a boarding operation mode in which the driver boards and operates the subject vehicle V and a remote operation mode in which the operator (driver) remotely controls the subject vehicle V from the outside of the subject vehicle V.

A method of presenting parking assist information in the parking assist apparatus 100 according to one or more embodiments of the present invention will be described below. In one or more embodiments of the present invention, the parking assist information is presented using the output device 20 which includes a display 21 and/or using the notification device 4 which includes the speaker 41, the lamp 42, and the vibration generator 43.

First, a method of displaying parking assist information using the display 21 will be described.

FIGS. 7A and 7B illustrate display examples of the parking assist information.

In each of display examples illustrated in FIGS. 7A and 7B, an overhead image (top view) 21a is displayed on the left side of the screen of the display 21, a monitoring image (normal view) 21b is displayed on the right side of the screen of the display 21, and messages 21c are displayed above the monitoring image 21b. The overhead image 21a includes an image (boundary lines of parking spaces) that indicates selectable parking spaces. The center of the overhead image 21a is displayed with an icon of the subject vehicle V indicating the position of the subject vehicle V. The monitoring image 21b can be displayed with different images captured by the cameras 1a to 1d in accordance with the operation state of the subject vehicle V. The monitoring image 21b illustrated in FIG. 7A is displayed as an image captured by the camera 1a which is disposed on the front grill part of the subject vehicle V. When the subject vehicle V moves back, the monitoring image 21b may be displayed as an image captured by the camera 1d which is disposed in the vicinity of the rear bumper. In this example, the overhead image 21a and the monitoring image 21b are simultaneously displayed on the display 21, but only the overhead image 21a may be displayed on the display 21, or only the monitoring image 21b may be displayed on the display 21.

FIGS. 7A and 7B illustrate the parking assist information displayed when the target parking space Mo is being searched. The subject vehicle V moves forward and the control device 10 waits for the selection information of the target parking space Mo to be entered. FIG. 7A illustrates a scene in which the previously-described parking space PL4 illustrated in FIG. 4B is detected as the recommended parking space Mr, and FIG. 7B illustrates a scene in which the previously-described parking space PL5 illustrated in FIG. 4C is detected as the recommended parking space Mr. After the parking assist information of FIG. 7A is presented, the parking assist information of FIG. 7B is presented.

The overhead image 21a is displayed with the available parking spaces Me and the recommended parking space Mr. In a scene in which the subject vehicle V searches for the available parking space Me while moving in the parking lot, the available parking spaces Me and the recommended parking space Mr change as the subject vehicle V moves. The parking assist apparatus 100 displays the available parking spaces Me and the recommended parking space Mr, which are sequentially detected, on the display 21. The parking assist apparatus 100 displays the available parking spaces Me with parking available marks in a circular shape and displays the recommended parking space Mr with a recommendation mark in a rectangular shape. Examples of the first/second parking space to be displayed in one or more embodiments of the present invention include the available parking spaces and the recommended parking space (here and hereinafter).

As illustrated in FIGS. 7A and 7B, when the subject vehicle V is moving, the available parking spaces Me and the recommended parking space Mr sequentially change as the subject vehicle V moves. When an available parking space Me or recommended parking space Mr changes, the parking assist apparatus 100 changes and displays the position of the available parking space or recommended parking space.

It is assumed that a parking space that exists ahead of the subject vehicle V is detected as the first parking space (examples of the first parking space include the available parking spaces and/or the recommended parking space, here and hereinafter) and its position is displayed. After that, if the first parking space becomes behind the subject vehicle V as the subject vehicle V moves, the first parking space is no longer a parking space that is suitable as the target parking space Mo. In order to park into the first parking space located behind the subject vehicle V, the subject vehicle V has to move backward. In this case, the time required for the parking process by the automated driving will be long and increase the parking-related cost.

Similarly, if another second parking space (examples of the second parking space include the available parking spaces and/or the recommended parking space, here and hereinafter) is detected after the first parking space is detected, the first parking space which is previously detected is no longer a parking space that is suitable as the target parking space. It appears that the time required for the parking process is shorter (the parking-related cost is lower) when parking into the second parking space detected under the current condition (position) than when parking into the first parking space detected under the past condition (position). In other words, when the automated parking is performed, parking into the second parking space is more convenient than parking into the first parking space.

When the vehicle speed of the subject vehicle V is high, if an available parking space Me or recommended parking space Mr is close to the subject vehicle V, the display position of the parking available mark or recommendation mark is changed each time the available parking space Me and the recommended parking space Mr change. If the display position suddenly changes, the time for the user to select the available parking space Me or the recommended parking space Mr may be insufficient. This is also true for the available parking spaces.

In one or more embodiments of the present invention, a method of display is proposed which allows the user to readily select a parking space when the recommended parking space/available parking spaces transition as the subject vehicle V moves.

The method of displaying parking assist information according to one or more embodiments of the present invention will be specifically described below.

Figure 8A:
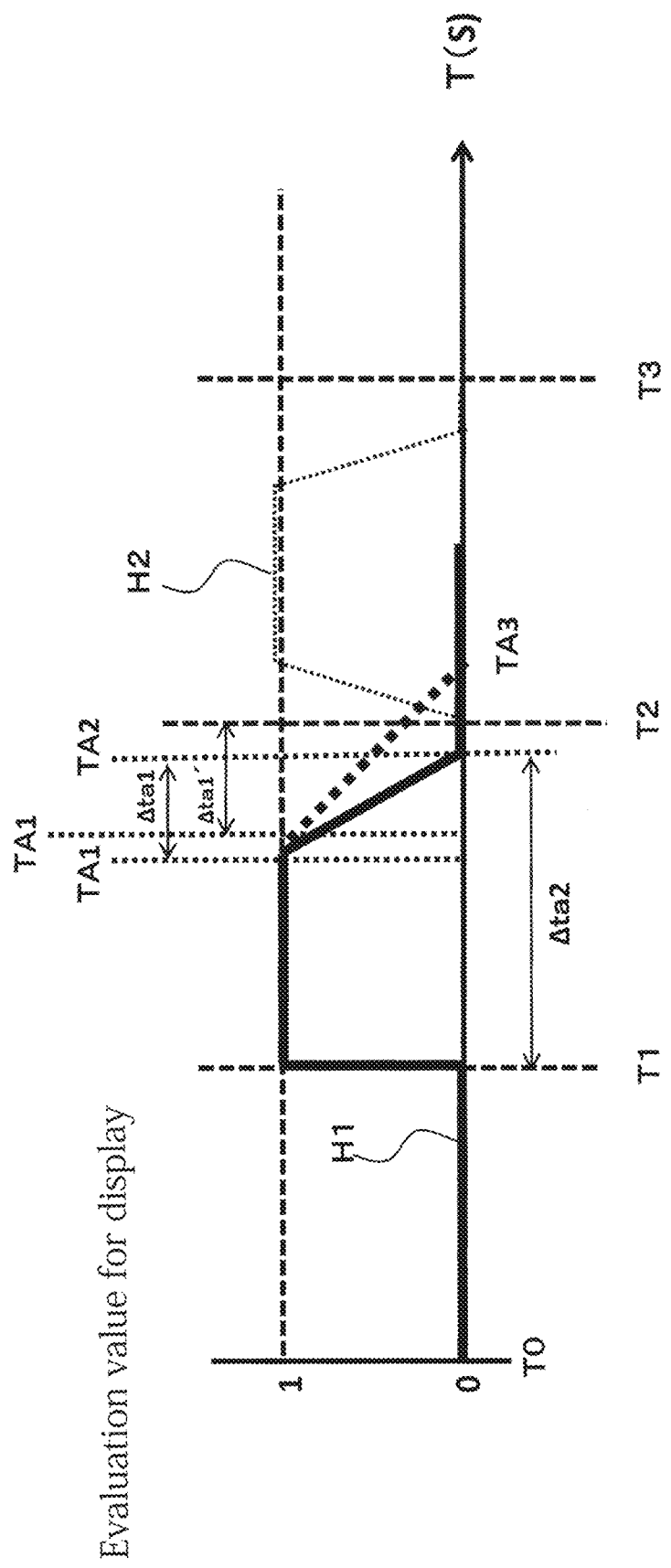
FIG. 8A is a diagram illustrating a first example of a control process for a display form of a parking space.
Figure 8B:
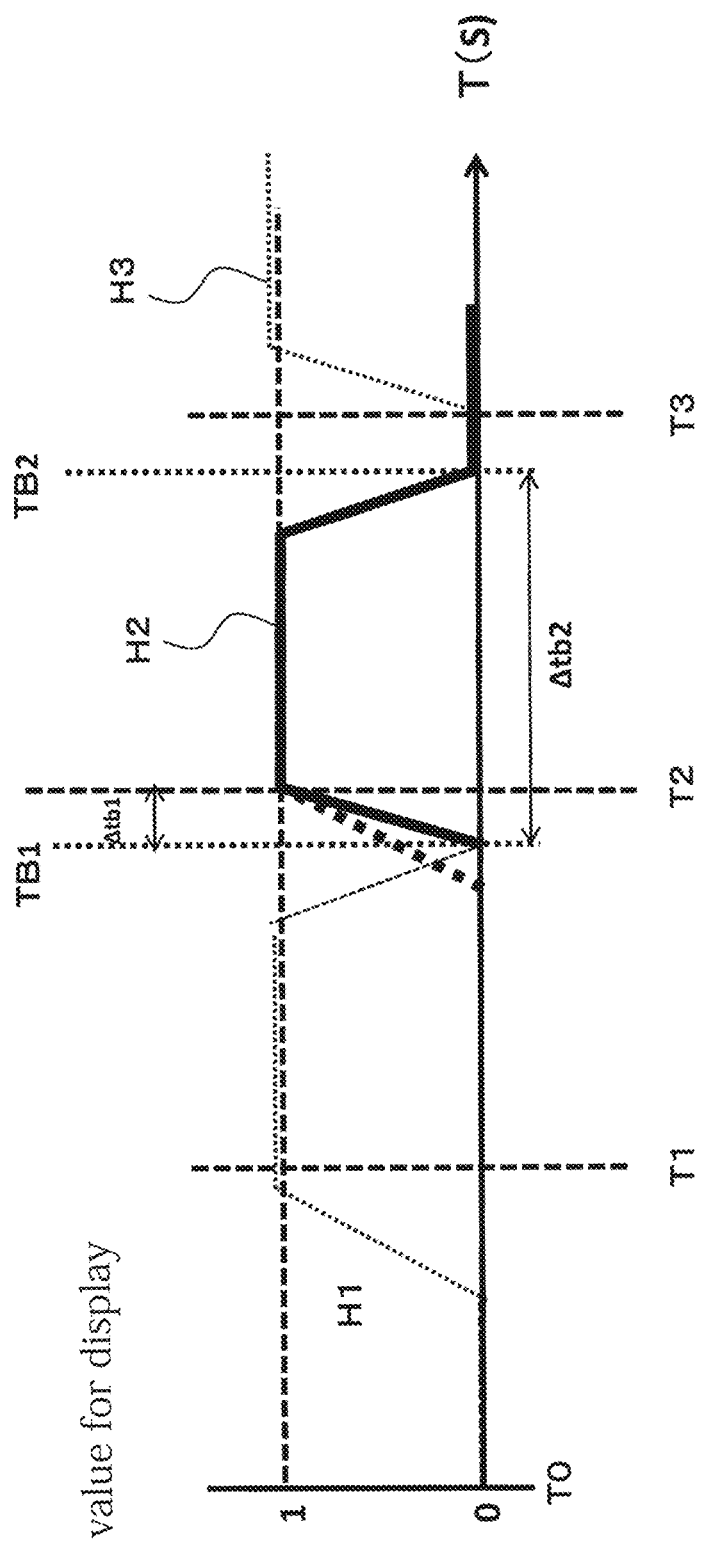
FIG. 8B is a diagram illustrating a second example of a control process for a display form of a parking space.

FIGS. 8A and 8B are views for describing examples of the method of display according to one or more embodiments of the present invention.

With reference to FIG. 8A, a first method of display according to one or more embodiments of the present invention will be described.

In the first method of display performed in the parking assist apparatus 100 according to one or more embodiments of the present invention, the control device 10 displays the first parking space, which satisfies a parking condition that is preliminarily defined, in a first display form on the display 21 and displays the first parking space in a second display form different from the first display form on the display 21 "when it is estimated or detected that the first parking space will not satisfy the parking condition."

In a different aspect of the first method of display, the control device 10 displays the first parking space, which satisfies a parking condition that is preliminarily defined, in the first display form on the display 21 and displays the first parking space in the second display form different from the first display form on the display 21 "when it is estimated or detected that a second parking space other than the first parking space will satisfy the parking condition".

In one or more embodiments of the present invention, the display form is switched at timing when it is estimated or detected that the first parking space will not satisfy the parking condition or at timing when it is estimated or detected that the second parking space will satisfy the parking condition.

The "timing when it is estimated or detected that the first parking space will not satisfy the parking condition" refers to timing when the first parking space satisfies the parking condition at the present moment if a determination is made on the basis of the current positional relationship or the like between the subject vehicle V and the first parking space, but it is estimated or detected that the first parking space will not satisfy the parking condition at a time point after a predetermined time from the current time point if taking into account the moving direction and moving speed of the subject vehicle V. That is, the "timing when it is estimated or detected that the first parking space will not satisfy the parking condition" is the timing earlier than the timing when the first parking space actually does not satisfy the parking condition.

The "timing when it is estimated or detected that the second parking space will satisfy the parking condition" refers to timing when the second parking space does not satisfy the parking condition at the present moment if a determination is made on the basis of the current positional relationship or the like between the subject vehicle V and the second parking space, but it is estimated or detected that the second parking space will satisfy the parking condition at a time point after a predetermined time from the current time point if taking into account the moving direction and moving speed of the subject vehicle V. That is, the "timing when it is estimated or detected that the second parking space will satisfy the parking condition" is the timing later than the timing when the second parking space actually satisfies the parking condition.

Specifically, after the display 21 displays the first parking space satisfying the predefined parking condition in the first display form on the display 21, when it is estimated or detected that the first parking space will not satisfy the parking condition, the control device 10 according to one or more embodiments of the present invention controls the display 21 to display the first parking space in the second display form different from the first display form.

In addition or alternatively, after the display 21 displays the first parking space satisfying the predefined parking condition in the first display form on the display 21, when it is estimated or detected that the second parking space other than the first parking space will satisfy the parking condition, the control device 10 according to one or more embodiments of the present invention controls the display 21 to display the first parking space in the second display form different from the first display form.

In one or more embodiments of the present invention, as substitute for the "parking condition" for estimating or detecting that a parking space satisfying the parking condition will not satisfy the parking condition, a "parking estimation condition" different from the "parking condition" may be set. The "parking estimation condition" is set for each of the parking possible condition for detecting the available parking spaces and the parking recommendation condition for detecting the recommended parking space. When the first parking space satisfies the "parking estimation condition," the control device 10 estimates or detects that the first parking space will not satisfy the "parking condition." For example, when the "parking condition" includes a condition that the parking space is located ahead of the subject vehicle V, the "parking estimation condition" may be a condition that the distance between the subject vehicle V and the parking space is less than a predetermined value. Immediately after the distance between the subject vehicle V and the parking space becomes less than the predetermined value, the parking space will exist behind the subject vehicle V rather than ahead of the subject vehicle V. The control device 10 determines the timing when satisfying the "parking estimation condition" as the timing when the "parking condition" will not be satisfied. This point of view can be applied to the case of changing from the first display form to the second display form and the case of changing from a third display form to a fourth display form.

The vertical axis illustrated in FIG. 8A represents an evaluation value (assessment value) for display in the first display form and the second display form. The evaluation value is a value for evaluating whether or not the display is clear. The evaluation value is defined such that the display becomes clearer as the evaluation value approaches 1 while the display becomes more unclear as the evaluation value approaches 0. The display becomes more conspicuous/emphasized as the evaluation value approaches 1 while the display becomes more inconspicuous/non-emphasized as the evaluation value approaches 0. The evaluation value represents the relative relationship of the degree of emphasis between the display in the first display form and the display in the second display form. Specifically, when the evaluation value is the luminance of a diagrammatic image, the diagrammatic image is displayed with higher luminance as the evaluation value approaches 1 while the diagrammatic image is displayed with lower luminance as the evaluation value approaches 0. When the evaluation value is the color phase of a diagrammatic image, the diagrammatic image is displayed in more conspicuous color (advancing color) as the evaluation value approaches 1 while the diagrammatic image is displayed in more inconspicuous color (retreating color) as the evaluation value approaches 0. When the evaluation value is the thickness of lines of a diagrammatic image, the line thickness is thicker as the evaluation value approaches 1 while the line width is thinner as the evaluation value approaches 0. When the evaluation value is the form of lines of a diagrammatic image, the lines are in a more emphasized form (double lines, solid lines, thick lines) as the evaluation value approaches 1 while the lines are in a more non-emphasized form (single lines, broken lines, thin lines) as the evaluation value approaches 0. Emphasis/non-emphasis of the display form is relative evaluation.

As illustrated in FIG. 8A, the first parking space is displayed in the first display form at timing T1 when the first parking space (available parking space, recommended parking space) is first detected. It is preferred to clearly indicate the first parking space, which is detected first, at the timing of detection.

When the subject vehicle V is moving, the positional relationship between the subject vehicle V and the first parking space varies and there may thus be a case in which the first parking space will not satisfy the parking condition. In such a case, the first parking space, which is previously indicated, will not be the available parking space/recommended parking space in some cases.

For example, when the parking condition includes a condition that "the first parking space is located at the traveling direction side of the subject vehicle V," it can be estimated that the subject vehicle V will pass through the first parking space from the change in the positional relationship between the subject vehicle V and the first parking space. At this time, the control device 10 estimates that the first parking space will not satisfy the parking condition (satisfies the parking estimation condition). The control device 10 can calculate the timing at which the subject vehicle V passes by the side of the first parking space, from the vehicle speed of the subject vehicle V and the current distance to the first parking space. On the basis of the position and vehicle speed of the subject vehicle V and the positional relationship with the first parking space, the control device 10 may calculate the timing of satisfying the "parking condition" and determine the state at timing before a predetermined time from that time as a "state in which it is estimated that the parking condition will not be satisfied." "Estimating that the parking condition will not be satisfied" means that a determination is made that the parking condition is satisfied at the present moment but will not be satisfied in the future, from the position and vehicle speed of the subject vehicle V and the positional relationship with the first parking space.

In one or more embodiments of the present invention, an example has been described in which the control device 10 compares the estimated situation of the first parking space and the parking condition to estimate whether or not the first parking space satisfies the parking condition, but the present invention is not limited to this. That is, the control device 10 may compare the current situation of the first parking space and the "parking estimation condition," which is different from the "parking condition," to determine whether the first parking space will satisfy the "parking condition" in the future or will not satisfy the parking condition. For example, when the parking condition is that "the first parking space is located at the traveling direction side of the subject vehicle V," the first parking space may shift (state may change) to a position in a direction in which the first parking space does not satisfy the parking condition, as the subject vehicle travels. To assess/evaluate a future position (state) of the first parking space, the control device 10 may set a "parking estimation condition" that is less likely to be satisfied than the "parking condition" and estimate that the probability that the first parking space will satisfy the "parking condition" is high, when the current first parking space satisfies the "parking estimation condition." Depending on the content of the "parking condition," the control device 10 may set a "parking estimation condition" that is more likely to be satisfied than the "parking condition" and estimate that the probability that the first parking space will satisfy the "parking condition" is high, when the current first parking space satisfies the "parking estimation condition."

When it is estimated that the first parking space will not satisfy the parking condition, the control device 10 changes the display form of the first parking space from the first display form to the second display form at timing TA1 before a predetermined time Δta1 from timing TA2 at which the first parking space will not satisfy the parking condition. By switching the display form from the first display form to the second display form, the driver can be notified that selection of the first parking space will not be allowed (the parking condition will not be satisfied in the future).

The control device 10 may display the first parking space in the second display form and then set the timing of ending the display of the first parking space to the timing before timing T2 at which the second parking space is displayed in the first display form. In an embodiment, as illustrated by the broken line in FIG. 8A, the control device 10 may set the timing of ending the display of the first parking space after the timing T2 to prolong the time for displaying the first parking space. The prolonged time for displaying the first parking space allows the driver (or passenger) to select the first parking space over time, and the driver can readily select the first parking space.

Likewise, when the subject vehicle V is moving, the positional relationship between the subject vehicle V and the first parking space varies and, therefore, the second parking space other than the first parking space, which exists ahead of the subject vehicle V, may satisfy the parking condition. In this case, the new second parking space different from the first parking space may be the available parking space/recommended parking space.

For example, when the parking condition includes a condition that "the second parking space is located within a predetermined distance from the subject vehicle V," it can be estimated that the subject vehicle V will approach the second parking space to be within the predetermined distance. At this time, the control device 10 estimates that the second parking space will satisfy the parking condition. The control device 10 can calculate the timing at which the subject vehicle V approaches the second parking space, from the vehicle speed of the subject vehicle V and the current distance to the second parking space. On the basis of the position and vehicle speed of the subject vehicle V and the positional relationship with the second parking space, the control device 10 can calculate the timing of satisfying the "parking condition" and determine the state at timing before a predetermined time from that time as a "state in which it is estimated that the parking condition will be satisfied." "Estimating that the parking condition will be satisfied" means that a determination is made that the parking condition is not satisfied at the present moment but will be satisfied in the future, from the position and vehicle speed of the subject vehicle V and the positional relationship with the first parking space. In an embodiment, when a "parking estimation condition" obtained by lowering the threshold of the "parking condition" (changing the threshold to a value that can readily be satisfied) is satisfied, the control device 10 may estimate that the second parking space will satisfy the parking condition.

In one or more embodiments of the present invention, an example has been described in which the control device 10 compares the estimated situation of the second parking space and the parking condition to estimate whether or not the second parking space satisfies the parking condition, but the present invention is not limited to this. That is, the control device 10 may compare the current situation of the second parking space and the "parking estimation condition," which is different from the "parking condition," to determine whether the first parking space will satisfy the "parking condition" in the future or will not satisfy the parking condition. For example, when the parking condition is that "the second parking space is located within a predetermined distance from the subject vehicle V," the second parking space may shift (state may change) to a position at which the second parking space satisfies the parking condition, as the subject vehicle travels. To assess/evaluate a future position (state) of the second parking space, the control device 10 may set a "parking estimation condition" that is more likely to be satisfied than the "parking condition" and estimate that the probability that the second parking space will satisfy the "parking condition" is high, when the current second parking space satisfies the "parking estimation condition." As will be under stood, depending on the content of the "parking condition," the control device 10 may set a "parking estimation condition" that is less likely to be satisfied than the "parking condition" and estimate that the probability that the second parking space will satisfy the "parking condition" is high, when the current second parking space satisfies the "parking estimation condition."

When it is estimated that the second parking space will satisfy the parking condition, the control device 10 changes the display form of the first parking space from the first display form to the second display form at timing TA1' before a predetermined time Δta1' from the timing T2 at which the second parking space will satisfy the parking condition. By switching the display form from the first display form to the second display form, the driver can be notified that the second parking space, which is newly available, will be selected. The driver can also be notified that the possibility that the first parking space, which is previously displayed as satisfying the parking condition, will not satisfy the parking condition is high (selection of the first parking space will not be allowed).

The control device 10 may set the timing of starting the display of the second parking space in the third display form at the same time as or after the timing of ending the display of the first parking space which is previously presented. In an embodiment, as illustrated by the broken line in FIG. 8A, the control device 10 may set the timing of starting the display of the second parking space before the timing of ending the display of the first parking space to prolong the time for displaying the second parking space. The prolonged time for displaying the second parking space allows the driver (or passenger) to select the second parking space over time, and the driver can readily select the second parking space.

The timing TA1 and the timing TA1' may be the same timing or may also be different timing. At the timing TA1, the display is switched on the basis of the timing TA2 at which the first parking space will not be satisfied (i.e., this state is estimated). At the timing TA1', the display is switched on the basis of the timing T2 at which the second parking space will be satisfied (i.e., this state is estimated).

The predetermined time Δta1 defining the timing TA1 and the predetermined time Δta1' defining the timing TA1' may be defined as the same length or may also be defined as different lengths.

Although not particularly limited, the control device 10 displays an image indicating the first parking space in the second display form with a relatively lower degree of emphasis than the first display form. Thus, the first parking space estimated not to satisfy the parking condition can be displayed in the second display form, which is relatively inconspicuous than the first display form, thereby to notify the driver that the first parking space will be no longer the most suitable parking space.

Although not particularly limited, the control device 10 may change the second display form so that the image indicating the first parking space is displayed gradually in a blurred manner (in a fad-out manner). Specifically, as illustrated in FIG. 8A, after the display form is changed from the first display form to the second display form at the timing TA1, the second display form can be further changed to an inconspicuous display form (the display form can be changed so that the evaluation value (assessment value) for display asymptotically approaches 0). Thus, the first parking space can be displayed in the second display form, which is gradually changed so as to be displayed in an inconspicuous manner, thereby to notify the driver that the first parking space will be a parking space that cannot be selected over time.

As illustrated in FIG. 8A, the display of the first parking space in the second display form may be stopped at the timing TA2 before the timing T2 at which the next second parking space is detected, or may also be stopped at the timing TA3 after the timing T2 at which the next second parking space is detected. For reference, in FIG. 8A, the display form of the second parking space is exemplified by the broken line H2, but the present invention is not limited to this.

In the parking assist apparatus 100 according to one or more embodiments of the present invention, the control device 10 determines the first time Δta1, Δta1' from the timing TA1 at which the first parking space is displayed in the second display form to the timing TA2 at which the first parking space is non-displayed, in accordance with the speed of the subject vehicle V. The control device 10 determines the first time Δta1, Δta1' from the timing at which the display is switched from the first display form to the second display form, that is, the timing TA1 of notifying the possibility that the selection of the first parking space will not be allowed, to the timing TA2 at which the first parking space is non-displayed, in accordance with the speed of the subject vehicle V. The control device 10 sets the first time Δta1, Δta1' longer as the speed of the subject vehicle V increases. In an embodiment, the control device 10 may set the ratio of the first time Δta1, Δta1' to a first time Δta2 from the timing at which the first parking space is displayed in the first display form to the timing at which the first parking space is non-displayed, with reference to the first time Δta2. This can notify the driver and/or passengers (operator or occupant) of the possibility that the selection of the first parking space will not be allowed. The driver and passenger can therefore readily perceive that the first parking space will not satisfy the parking condition.

In the parking assist apparatus 100 according to one or more embodiments of the present invention, when the first parking space which is previously presented and the second parking space which is next presented are adjacent to each other, the control device 10 prolongs the above first time Δta1, Δta1' to be set as compared with the case in which the first parking space and the second parking space are not adjacent to each other.

When the first parking space and the second parking space are adjacent to each other, it is highly possible that the transition of a parking space (available parking space/ recommended parking space) occurs in a short time. In such a case, it is preferred to notify the driver early that the first parking space will not be available. When the first parking space and the second parking space are adjacent to each other, the first time Δta1, Δta1' is prolonged than when not. To prolong the first time Δta1, Δta1', the timing TA1 at which the display is changed from the first display form to the second display form may be advanced. This can elongate the time during which the first parking space can be selected even when the first parking space and the second parking space are adjacent to each other, and the driver can ensure the time for selecting the first parking space.

As an example of the control, when the time period between the timing at which the first parking space satisfies the parking condition and the timing at which the second parking space satisfies the parking condition is not longer than a predetermined time period, the control device 10 according to one or more embodiments of the present invention prohibits the display form of the first parking space from switching from the first display form to the second display form even when it is estimated that the second parking space other than the first parking space will satisfy the parking condition. In this case, the control device 10 continues to display the first parking space in the first display form. That is, the display process for the first parking space in the first display form is continued. Then, when the control device 10 detects the second parking space and thereafter estimates that a third parking space other than the first and second parking spaces will satisfy the parking condition, the control device 10 switches the first parking space into the second display form.

When the first parking space and the second parking space are close to each other, the second parking space is detected immediately after the detection of the first parking space, and the first display form for displaying the first parking space may therefore be changed soon. Also when the vehicle speed is high, the second parking space is detected immediately after the detection of the first parking space, and the first display form for displaying the first parking space may therefore be changed soon. Thus, when a parking space into which parking is possible exists within a short distance or when the vehicle speed of the subject vehicle V is high, the switching period of the display form is shortened and it may be difficult for the driver or passengers to readily select the parking space. In this process, when the time period between the timing at which the first parking space satisfies the parking condition and the timing at which the second parking space satisfies the parking condition is not longer than a predetermined time period, this case is assessed/ evaluated as a case in which the available parking spaces are close to each other or a case in which the vehicle speed of the subject vehicle V is high, and the change of the display form of the first parking space is once prohibited to continue the display in the first display form. This allows the driver or passengers to readily select the first parking space because the time during which the first parking space is displayed in the same display form (first display form) is prolonged.

The second method of display according to one or more embodiments of the present invention will be described in detail with reference to FIG. 8B.

In the second method of display according to one or more embodiments of the present invention, when the control device 10 displays the first parking space in the first display form and thereafter estimates that the second parking space will satisfy the parking condition, at the stage of estimation, the control device 10 displays the second parking space in a third display form on the display 21. Thereafter, the control device 10 displays the second parking space in a fourth display form on the display 21. The timing at which the second parking space is displayed in the fourth display form on the display 21 is preferably the timing at which the second parking space actually satisfies the parking condition.

Thus, at the timing at which it is estimated that the second parking space will satisfy the parking condition, the second parking space can be preliminarily displayed thereby to notify the driver that the selection of the next parking space will be allowed. Moreover, the display form is changed from the third display form to the fourth display form at the timing at which the second parking space actually satisfies the parking condition, and the driver can therefore be notified that the preliminarily notified state changes to a state in which the selection is actually allowed.

The assessment/evaluation value of the diagram illustrated in FIG. 8B is common to the assessment/evaluation value of the diagram illustrated in FIG. 8A. As illustrated in FIG. 8B, the control device 10 determines that the second parking space actually satisfies the parking condition at the timing T2 after the timing T1 at which the first parking space (available parking space, recommended parking space) is detected. Before the timing T2, the control device 10 determines whether or not it is estimated that the second parking space will satisfy the parking condition.

When the subject vehicle V is moving, the positional relationship between the subject vehicle V and the second parking space varies and, therefore, the second parking space other than the first parking space may newly satisfy the parking condition. For example, when the parking condition includes a condition that "the parking space is located within a predetermined distance from the subject vehicle V," it can be estimated that the distance between the subject vehicle V and the second parking space will be within the predetermined distance from the event that the subject vehicle V approaches the second parking space. At this time, the control device 10 can estimate that the second parking space will satisfy the parking condition. The control device 10 can calculate the timing at which the distance between the subject vehicle V and the second parking space will be within the predetermined distance, on the basis of the vehicle speed of the subject vehicle V and the current distance to the second parking space.

In this example, the timing TB1 before the timing T2 is the timing at which it is estimated that the second parking space will satisfy the parking condition. The timing at which it is estimated that the second parking space will satisfy the parking condition refers to the timing at which the possibility that the second parking space will satisfy the parking condition is determined from the vehicle speed of the subject vehicle V and the relationship between the current position of the subject vehicle V and the second parking space and a determination is made that the possibility of satisfying the parking condition is not lower than a predetermined value. For example, provided that the parking condition is the upper limit of the distance (a condition that the distance is not longer than Q is the parking condition), when the value is less than a predetermined multiple number that is defined by the parking condition (the distance is Q×1.2 or less), it is estimated that the second parking space will satisfy the parking condition. The timing at which it is estimated that the second parking space will satisfy the parking condition can be obtained as the timing before the timing T2 at which the second parking space actually satisfies the parking condition.

When it is estimated that the second parking space will satisfy the parking condition, the control device 10 changes the display form of the first parking space from the third display form to the fourth display form at timing TB1 before a predetermined time Δtb1 from the timing T2 at which the second parking space will satisfy the parking condition. By switching the display form from the third display form to the fourth display form, the driver can be notified that the selection of the second parking space will be allowed.

Although not particularly limited, at the timing TB1, the control device 10 displays the second parking space in the third display form with a relatively low degree of emphasis and then displays the second parking space in the fourth display form with a relatively high degree of emphasis. Through this operation, the second parking space estimated to satisfy the parking condition can be displayed in the third display form, which is relatively inconspicuous, thereby to notify the driver of the possibility that the second parking space can be selected as the parking space. Thereafter, at the timing T2 at which the parking condition is actually satisfied, the second parking space can be displayed in the fourth display form, which is relatively conspicuous, thereby to notify the driver that the second parking space can be actually selected as the parking space.

Although not particularly limited, the control device 10 may change the third display form so that the image indicating the second parking space is displayed gradually in a clear manner (in a fad-in manner). Specifically, as illustrated in FIG. 8B, after the second parking space is displayed in the third display form at the timing TB1, the third display form can be changed to an emphasized display form (the display form can be changed so that the assessment/evaluation value for display asymptotically approaches 1). Thus, the second parking space can be displayed in the third display form, which is gradually changed so as to be displayed in an emphasized manner, thereby to notify the driver that the first parking space will be a parking space that can be selected in the future.

As illustrated in FIG. 8B, the display of the second parking space in the third display form may be stopped at the timing TB2 before the timing T3 at which the next third parking space is detected, or may also be stopped at the timing after the timing T3 at which the next third parking space is detected. For reference, in FIG. 8B, the display form of the third parking space is exemplified by the broken line H3, but the present invention is not limited to this.

In the parking assist apparatus 100 according to one or more embodiments of the present invention, the control device 10 determines the second time Δtb1 from the timing TB1 at which the second parking space is displayed in the third display form to the timing T2 at which the second parking space is displayed in the fourth display form, in accordance with the speed of the subject vehicle V. The control device 10 determines the second time Δtb1 from the timing at which the display is switched from the third display form to the fourth display form, that is, the timing TB1 notifying that the selection of the second parking space will be allowed, to the timing T2 at which the second parking space can be actually selected, in accordance with the speed of the subject vehicle V. The control device 10 sets the second time Δtb1 longer as the speed of the subject vehicle V increases. This allows for earlier notification that the second parking space can be selected as the speed of the subject vehicle V is higher. The driver can sufficiently ensure the time for contemplating the second parking space. In an embodiment, the control device 10 may set the ratio of the second time Δtb1 to a time Δtb2 from the timing at which the second parking space is displayed in the fourth display form to the timing at which the second parking space is non-displayed, with reference to the time Δtb2. This allows the occupants (including the driver) to sufficiently ensure the time for contemplating the second parking space.

In the parking assist apparatus 100 according to one or more embodiments of the present invention, the control device 10 sets longer the second time Δtb1 which is set when the second parking space is adjacent to another available parking space (first parking space or third parking place) than the second time Δtb1 which is set when the second parking space is not adjacent to another available parking space (first parking space or third parking place).

When the second parking space is adjacent to another available parking space (first parking space or third parking place), it is highly possible that the transition of a parking space (available parking space/recommended parking space) occurs in a short time. In such a case, it is preferred to notify the driver early that the second parking space will be available. When the second parking space is adjacent to another available parking space, therefore, the second time Δtb1 is prolonged than when not. To prolong the second time Δtb1, the timing TB1 of starting the third display form may be advanced. This can elongate the time during which the second parking space is contemplated.

From the viewpoint of ensuring a sufficient time for selecting the parking space, in the process of detecting the recommended parking space which satisfies the parking condition among the previously-described available parking spaces, when the first parking space is extracted as the recommended parking space at the previous first timing, it is preferred to extract the second parking space which is not adjacent to the first parking space, as the recommended parking space at the subsequent second timing. If an adjacent parking space is selected as the recommended parking space, the switching period of display of the recommended parking space is shortened. If parking spaces are switched in a short time, it may be difficult for the driver to select a target parking space. When the previously extracted recommended parking space and the currently extracted recommended parking space are adjacent to each other, the currently extracted recommended parking space is not displayed. This can prolong the time for displaying the recommended parking space to ensure the time for the driver to select.

The display forms according to one or more embodiments of the present invention will then be described.

In one or more embodiments of the present invention, the first display form and the second display form have the following features.

(1) Luminance
(2) Line thickness of diagrammatic images
(3) Form of lines such as solid lines, broken lines, and double lines
(4) Form of size (scaling) of diagrammatic images
(5) Presence or absence of blinking display, period of blinking display
(6) Color phase, brightness, chromaticness, shade (tone), pattern, and gradation of diagrammatic images
(7) Pixel density
(8) Countdown display In one or more embodiments of the present invention the relationship between the first display form and the second display form can be defined as below.

(A) Method of Fade-Out Display

This is a method in which the image indicating the first parking space is displayed gradually in a blurred manner (in a non-emphasized manner).

The above-described first display form represents emphasized display while the second display form represents non-emphasized display. Emphasized display of images refers to a display form that gives a relatively strong stimulus to the visual sense of the driver and passengers and relatively strongly attracts attention of a person. Non-emphasized display of images refers to a display form that has a relatively weak effect of attracting attention of the driver and passengers. Specifically, the first display form and the second display form are defined as follows. The first display form and second display form thus defined can be switched thereby to notify the transition of the available parking spaces/recommended parking space.

(1) The first display form is high-luminance display while the second display form is low-luminance display. High-luminance display refers to a display form in which the luminance is made relatively high.

(2) The line thickness of diagrammatic images in the first display form is made relatively thick while the line thickness of diagrammatic images in the second display form is made relatively thin.

(3) The diagram in the first display form is indicated by a solid line while the diagram in the second display form is indicated by a broken line. The diagram in the first display form is indicated by a double line while the diagram in the second display form is indicated by a solid line or a broken line.

(4) The size of a diagrammatic image in the first display form is made relatively large while the size of a diagrammatic image in the second display form is made relatively small.

(5) The first display form is blinking display while the second display form is non-blinking display. The blinking display refers to a display form in which display and non-display are repeated at a predetermined period or lighting and extinction are repeated. The blinking period in the blinking display of the first display form is made relatively long while the blinking period in the blinking display of the second display form is made relatively short.

(6) The diagram colored in the first display form is displayed in an advancing color with which the colored diagram is seen relatively close, while the diagram colored in the second display form is displayed in a retreating color with which the colored diagram is seen relatively far. The advancing color refers to a color with which the colored diagram is seen relatively close, that is, a relatively warm, highly bright, and/or highly chromatic color in the color circle, for example, yellow, orange, and red. On the other hand, the retreating color refers to a color with which the colored diagram is seen relatively far, that is, a relatively cold, poorly bright, and/or poorly chromatic color in the color circle, for example blue, purple, and black. The image displayed with such an advancing color is seen in a relatively emphasized manner.

(7) The pixel density in the first display form is increased while the pixel density in the second display form is reduced. The pixel density refers to a density of pixels in the region corresponding to the diagrammatic image. The higher the pixel density, the more emphasized the display, while the lower the pixel density, the less emphasized the display.

(8) Countdown display is not conducted in the first display form while countdown display is conducted in the second display form.

FIGS. 9A and 9B are a set of views illustrating an example of the first display form and examples of the second display form. An example of the first display form is illustrated in FIG. 9A while examples of the second display form are illustrated in FIG. 9B.

In the first display form illustrated in FIG. 9A, the frame indicating the parking space is indicated by a solid line, and the thickness of the frame is displayed relatively thick. FIG. 9B illustrates two display examples b1 and b2 in the second display form. In the second display form illustrated in Part (b1), the frame indicating the parking space is displayed by a broken line. In the second display form illustrated in Part (b2), the thickness of the frame indicating the parking space is displayed relatively thinner than that in the first display form in FIG. 9A. Both of the two display examples b1 and b2 in the second display form illustrated in FIG. 9B are in display forms that are different from the first display form and that are more inconspicuous than the first display form. In the display example illustrated in FIG. 9B, Part (b2), the thickness of the frame indicating the parking space is displayed relatively thinner than the display example illustrated in part (b1). The display example b2 is a more inconspicuous display than the display example b1.

Display examples based on the control of FIG. 8A will be described. FIG. 9A in the first display form is displayed at timing T1, and Part (b1) of FIG. 9B in the second display form is then displayed at the timing TA1. By changing the display form at the timing TA1, the driver can be notified that the parking space will be changed. The display form may be changed from the second display form (b1) to the second display form (b2) after the timing TA1 and before the timing TA2. As illustrated in FIG. 8A, the change from the second display form (b1) may be a continuous change, such as gradually increasing the pitch of the broken line and gradually decreasing the thickness of the broken line.

(B) Fade-In Display (Gradually Clearing Display)

In one or more embodiments of the present invention the relationship between the third display form and the fourth display form can be defined as below.

Fade-in display refers to a method in which the image indicating the second parking space is displayed gradually in a clear manner (in an emphasized manner). The second parking space is displayed in the third display form in a non-emphasized manner and then displayed in the fourth display form in an emphasized manner. Specifically, the third display form and the fourth display form are defined as follows. To avoid duplicate description, the description of the fade-out display is borrowed herein. The third display form and fourth display form thus defined can be switched thereby to notify the transition of the available parking spaces/recommended parking space.

(1) The third display form is low-luminance display while the fourth display form is high-luminance display.

(2) The line thickness of diagrammatic images in the third display form is made relatively thin while the line thickness of diagrammatic images in the fourth display form is made relatively thick.

(3) The diagram in the third display form is indicated by a broken line while the diagram in the fourth display form is indicated by a solid line. The diagram in the third display form is indicated by a solid line or a broken line while the diagram in the fourth display form is indicated by a double line.

(4) The size of a diagrammatic image in the third display form is made relatively small while the size of a diagrammatic image in the fourth display form is made relatively large.

(5) The third display form is non-blinking display while the fourth display form is blinking display. The blinking period in the blinking display of the third display form is made relatively short while the blinking period in the blinking display of the fourth display form is made relatively long.

(6) The diagram colored in the third display form is displayed in a retreating color while the diagram colored in the fourth display form is displayed in an advancing color.

(7) The pixel density in the third display form is reduced while the pixel density in the fourth display form is increased.

(8) Countdown display is conducted in the third display form while countdown display is not conducted in the fourth display form.

Figure 9C:
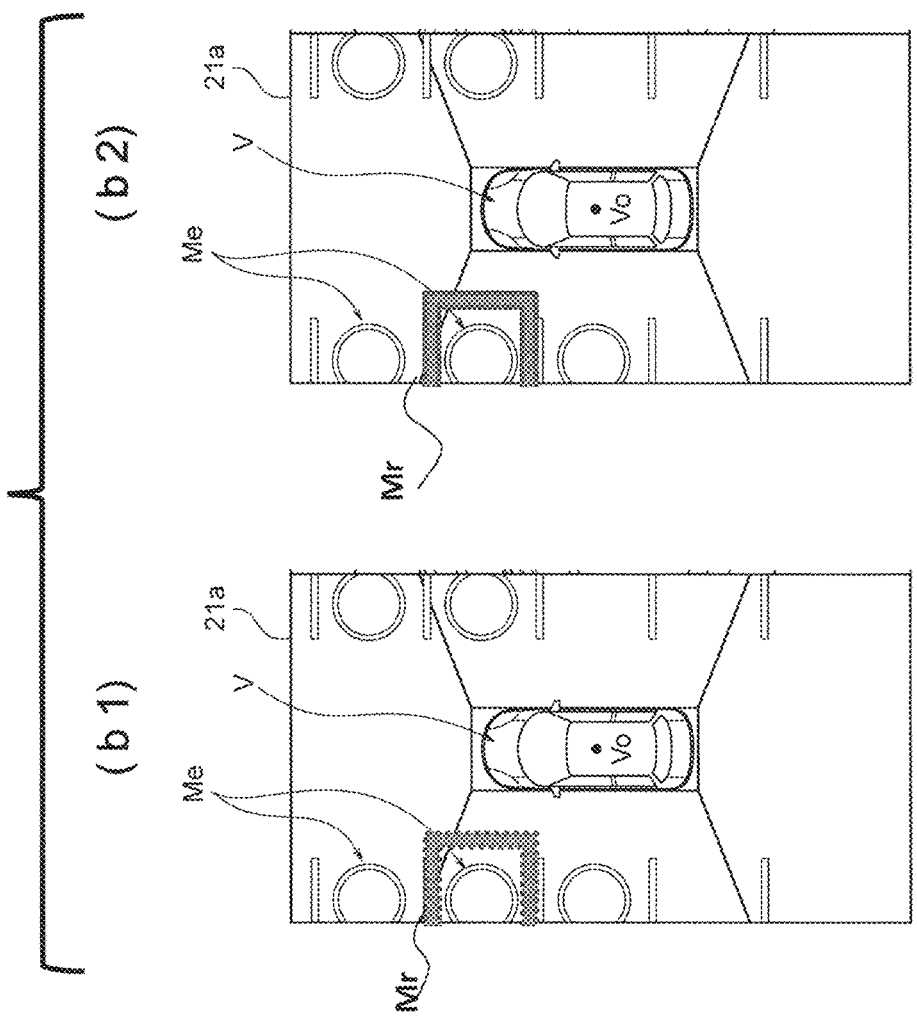
FIGS. 9C and 9D illustrate an example of a third display form and a fourth display form, respectively.
Figure 9D:
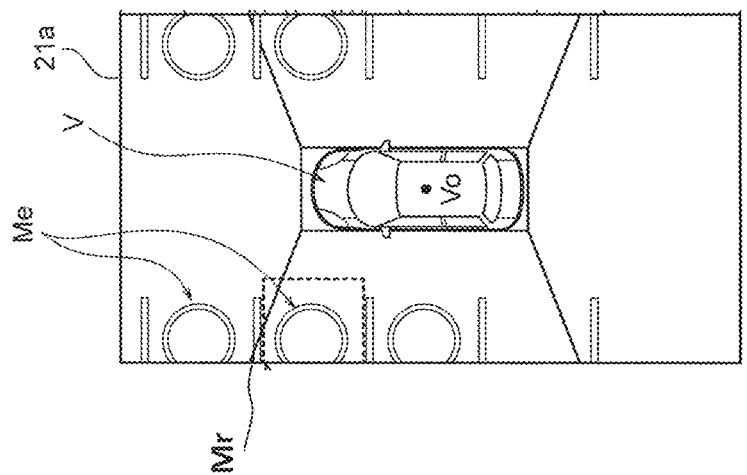

FIGS. 9C and 9C are a set of views illustrating an example of the third display form and examples of the fourth display form. An example of the third display form is illustrated in FIG. 9C while examples of the fourth display form are illustrated in FIG. 9D.

In the third display form illustrated in FIG. 9C, the frame indicating the parking space is indicated by a broken line, and the thickness of the frame is displayed relatively thin. FIG. 9D illustrates two display examples b1 and b2 in the fourth display form. In the fourth display form illustrated in Part (b1), the frame indicating the parking space is displayed by a broken line. In the fourth display form illustrated in Part (b2), the thickness of the frame indicating the parking space is displayed relatively thicker than that in the third display form in FIG. 9C. Both of the two display examples b1 and b2 in the fourth display form illustrated in FIG. 9D are in display forms that are different from the third display form and that are more conspicuous (emphasized) than the third display form. In the display example illustrated in Part (b2), the frame indicating the parking space is displayed by a solid line, which is relatively emphasized than the display example of a broken line illustrated in Part (b1).

Display examples based on the control of FIG. 8B will be described. FIG. 9C in the third display form is displayed at timing TB1, and Part (b1) of FIG. 9D in the fourth display form is then displayed at the timing T2. By indicating the position of the second parking space in different display forms at the timing TB1, the driver can be notified that the selection of a newly displayed parking space will be allowed. The display form may be changed from the third display form (b1) to the fourth display form (b2) after the timing TB1 and before the timing T2. As illustrated in FIG. 8B, the change from the third display form (b1) may be a continuous change, such as gradually decreasing the pitch of the broken line and gradually increasing the thickness of the broken line.

In one or more embodiments of the present invention, the notification device 4 is used to call attention of the driver. When it is estimated that the first parking space will not satisfy the parking condition or when it is estimated that the second parking space other than the first parking space will satisfy the parking condition, the control device 10 changes the notification mode of the notification device 4. As an example, the control device 10 controls the notification device 4 to make notification in a first notification mode when the first parking space is displayed in the first display form and make notification in a second notification mode different from the first notification mode when the first parking space is displayed in the second display form.

Thus, when it is estimated that the first parking space will not satisfy the parking condition or when it is estimated that the second parking space other than the first parking space will satisfy the parking condition, the notification device 4 changes the notification mode, and the driver can therefore be clearly notified of the timing at which the first parking space can be selected. This change of the notification mode can notify the driver that the selection of the first parking space will not be allowed.

In addition or alternatively, when it is estimated that the second parking space will satisfy the parking condition, the control device 10 according to one or more embodiments of the present invention changes the notification mode of the notification device 4. The control device 10 uses the notification device 4 to notify the second parking space in a third display form and then notify the second parking space in a fourth display form. When the second parking space is displayed in the third display form, the control device 10 uses the notification device 4 to make notification in a third notification mode. When the second parking space is displayed in the fourth third display form, the control device 10 uses the notification device 4 to make notification in a fourth notification mode.

Thus, when it is estimated that the second parking space will satisfy the parking condition, the notification mode is changed and the driver can be notified that the selection of the second parking space will be allowed.

The notification modes will be described. In one or more embodiments of the present invention, the first notification mode and the second notification mode have the following features.

<Notification Mode Concerning Voice or Sound>
(1) Volume level
(2) Period
<Notification Mode Concerning Lighting>
(1) Brightness
(2) Blinking period
<Notification Mode Concerning Vibration>
(1) Intensity
(2) Period In one or more embodiments of the present invention, the relationship between the first notification mode and the second notification mode can be defined as follows.

(A) Method of Fade-Out Notification

This is a method of gradually weakening the intensity of the output which notifies that the first parking space is displayed. Detection of the first parking space is notified in an emphasized manner and then notified in a manner in which the emphasis is relaxed. Notification in which the output intensity is emphasized refers to notification that gives a relatively strong stimulus to the visual/auditory/tactile sense of the driver and passengers and relatively strongly attracts attention of a person. Notification in which the output emphasis is suppressed (non-emphasis display) refers to notification that has a relatively weak effect of attracting attention of the driver and passengers. Specifically, the first notification mode and the second notification mode are defined as follows.

<Definition of Notification Mode Concerning Voice or Sound>
(1) The first notification mode is set with a higher volume level while the second notification mode is set with a lower volume level.
(2) The output period of voice or sound in the first notification mode is set longer while the output period of voice or sound in the second notification mode is set shorter. Voice or sound of a short period can notify that the time limit for selecting the first parking space is approaching.

<Definition of Notification Mode Concerning Lighting>
(1) The first notification mode is notified by lighting with higher brightness while the second notification mode is notified by lighting with lower brightness.
(2) The blinking period of the first notification mode is set longer while the blinking period of the second notification mode is set shorter. Lighting with a short blinking period can notify that the time limit for selecting the first parking space is approaching.

<Notification Mode Concerning Vibration>
(1) The first notification mode is notified with stronger vibration while the second notification mode is notified with weaker vibration.
(2) The vibration period of the first notification mode is set longer while the vibration period of the second notification mode is set shorter. Vibration with a short period can notify that the time limit for selecting the first parking space is approaching.

(B) Method of Fade-In Notification (Gradually Clearing Notification)

This is a method of gradually strengthening the intensity of the output which notifies that the third parking space is displayed. The estimation that the fourth parking space will be detected is notified in a non-emphasized manner (with weakened output intensity) and then notified in a strongly emphasized manner. Notification in which the output intensity is weakened refers to notification that gives a relatively weak stimulus to the visual/auditory/tactile sense of the driver and passengers and raises attention of a person. Notification in which the output emphasis is strengthened (emphasis display) refers to notification that strongly attracts attention of the driver and passengers. Specifically, the third notification mode and the fourth notification mode are defined as follows.

<Definition of Notification Mode Concerning Voice or Sound>
(1) The third notification mode is set with a lower volume level while the fourth notification mode is set with a higher volume level.
(2) The output period of voice or sound in the third notification mode is set shorter while the output period of voice or sound in the fourth notification mode is set longer.

<Definition of Notification Mode Concerning Lighting>
(1) The third notification mode is notified by lighting with lower brightness while the fourth notification mode is notified by lighting with higher brightness.
(2) The blinking period of the third notification mode is set longer while the blinking period of the fourth notification mode is set shorter. Lighting with a short blinking period can notify that the selection of the second parking space will be allowed.

<Notification Mode Concerning Vibration>
(1) The third notification mode is notified with weaker vibration while the fourth notification mode is notified with stronger vibration.
(2) The vibration period of the third notification mode is set shorter while the vibration period of the fourth notification mode is set longer. Vibration with a long period can notify that the selection of the second parking space will be allowed.

The parking assist method according to one or more embodiments of the present invention is used in a parking assist apparatus as the above and therefore has the following effects. The parking assist apparatus 100 according to one or more embodiments of the present invention is configured and operates as the above and therefore has the following effects.

(1) According to the parking assist method/method of displaying parking assist information in one or more embodiments of the present invention, the first parking space which satisfies a predefined parking condition is displayed in the first display form on the display 21, and when it is estimated that the first parking space will not satisfy the parking condition, the display form is switched from the first display form to the second display form. This can notify the driver that the timing at which the selection of the first parking space will not be allowed is approaching (it is estimated that the parking condition will not be satisfied).

According to the parking assist method/method of displaying parking assist information in one or more embodiments of the present invention, when it is estimated that the second parking space other than the first parking space will satisfy the parking condition, the display form is switched from the first display form to the second display form. This can notify the driver that the selection of the second parking space, which is newly available, will be allowed (it is estimated that the parking condition will be satisfied). In addition, the driver can be notified that it is highly possible that the first parking space, which is previously displayed as satisfying the parking condition, will not satisfy the parking condition (the selection of the first parking space will not be allowed).

(2) According to the method in one or more embodiments of the present invention, the first time $\Delta ta1$ from the timing TA1 at which the first parking space is displayed in the second display form to the timing TA2 at which the first parking space is non-displayed can be set longer as the speed of the subject vehicle V is higher. According to the method in one or more embodiments of the present invention, during a time $\Delta ta2$ from the timing T1 of display in the first display form to the timing T2 of completion of display in the second parking space, the timing TA1 of display in the second display form is changed to earlier timing to set longer the first time $\Delta ta1$ as the speed of the subject vehicle V is higher. The driver and passengers can thereby be notified of the possibility that the selection of the first parking space will be not allowed, over a relatively long period of time even when the speed of the subject vehicle V is high.

(3) According to the method in one or more embodiments of the present invention, when it is estimated that the second parking space other than the first parking space will satisfy the parking condition, the second parking space can be displayed in the third display form on the display 21 and then displayed in the fourth display form on the display 21. Thus, the display form of the second parking space can be switched from the third display form to the fourth display form thereby to notify the driver that the selection of the second parking space will be allowed.

(4) According to the method in one or more embodiments of the present invention, the second time $\Delta tb1$ from the timing TB1 at which the second parking space is displayed in the third display form to the timing T2 at which the second parking space is displayed in the fourth display form can be determined in accordance with the speed of the subject vehicle V. This can provide the driver with the time for selecting the second parking space in accordance with the speed of the subject vehicle V. In particular, as the speed of the subject vehicle V is higher, the second time $\Delta tb1$ can be set longer thereby to notify early that the second parking space can be selected, as the speed of the subject vehicle V is higher. The driver can ensure a sufficient time for contemplating the second parking space.

(5) According to the method in one or more embodiments of the present invention, the first time $\Delta ta1$, $\Delta ta1'$ which is set when the first parking space and the second parking space are adjacent to each other can be set longer than the first time $\Delta ta1$, $\Delta ta1'$ which is set when the first parking space and the second parking space are not adjacent to each other. This can provide the driver with a time period for selecting the first parking space in accordance with the arrangement of the first and second parking spaces to be detected. When the first parking space and the second parking space are adjacent to each other, it is highly possible that the transition of a parking space (available parking space/recommended parking space) occurs in a short time. In such a case, it is preferred to notify the driver early that the first parking space will not be available. When the first parking space and the second parking space are adjacent to each other, the first time $\Delta ta1$, $\Delta ta1'$ is prolonged than when not. This can elongate the time during which the first parking space can be selected even when a plurality of available parking spaces is adjacent to each other, and the driver can ensure the time for selecting the first parking space.

(6) According to the method in one or more embodiments of the present invention, the second time $\Delta tb1$ which is set when the second parking space is adjacent to another available parking space can be set longer than the second time $\Delta tb1$ which is set when the second parking space is not adjacent to another available parking space. This can provide the driver with a time period for selecting the second parking space in accordance with the arrangement of the second parking space to be detected. When the second parking space is adjacent to another parking space that satisfies the parking condition, it is highly possible that the transition of a parking space (available parking space/recommended parking space) occurs in a short time. In such a case, it is preferred to notify the driver early that the second parking space will not be available. When the second parking space is adjacent to another parking space that satisfies the parking condition, the second time $\Delta tb1$ is prolonged than when not. This can elongate the time during which the second parking space can be selected even when a plurality of available parking spaces is adjacent to each other, and the driver can ensure the time for selecting the second parking space.

(7) According to the method in one or more embodiments of the present invention, among the available parking spaces, the recommended parking space Mr satisfying the parking recommendation condition of the parking condition, which defines a parking space for recommendation, can be displayed in the first display form. Parking spaces that satisfy the parking condition are narrowed down into the recommended parking space, which is recommended to the driver, using the recommendation condition which is preliminarily determined. The recommended parking space is a parking space that is more recommended to be selected as the target parking space than an available parking space. According to the method in one or more embodiments of the present invention, in a scene in which parking is intended, the driver can sufficiently contemplate the recommended parking space.

(8) According to the method in one or more embodiments of the present invention, among the available parking spaces, the first parking space can be extracted as the recommended parking space at first timing, and the second parking space which is not adjacent to the first parking space can be extracted as the recommended parking space at second timing after the first timing. If an adjacent parking space is selected and displayed as the recommended parking space, the switching period of display of parking spaces is shortened. If the recommended parking space is switched in a short time, it may be difficult for the driver to select a target parking space. When the previously extracted recommended parking space and the currently extracted recommended parking space are adjacent to each other, the currently extracted recommended parking space is not displayed. This can prolong the time for displaying the recommended parking space to ensure the time for the driver to select.

(9) According to the method in one or more embodiments of the present invention, when the first parking space is displayed in the first display form, the notification device 4 is used to make notification in the first notification mode, while when the first parking space is displayed in the second display form, the notification device 4 is used to make notification in the second notification mode which is different from the first notification mode. When it is estimated that the first parking space will not satisfy the parking condition or when it is estimated that the second parking space other than the first parking space will satisfy the parking condition, the notification mode is changed and the driver can therefore be clearly notified of the timing at which the first parking space can be selected. This change of the notification mode can notify the driver that the selection of the first parking space will be not allowed.

(10) According to the method in one or more embodiments of the present invention, when the second parking space is displayed in the third display form, the notification device 4 is used to make notification in the third notification mode, while when the second parking space is displayed in the fourth display form, the notification device 4 is used to make notification in the fourth notification mode which is different from the third notification mode. Thus, when it is estimated that the second parking space will satisfy the parking condition, the notification mode can be changed thereby to notify the driver that the selection of the second parking space will be allowed.

(11) According to the method in one or more embodiments of the present invention, when the time period between the timing at which the first parking space satisfies the parking condition and the timing at which the second parking space satisfies the parking condition is not longer than a predetermined time period, the display form of the first parking space is prohibited from switching from the first display form to the second display form even when it is estimated that the second parking space other than the first parking space will satisfy the parking condition, and the display of the first parking space in the first display form is continued. In this method, when the time period between the timing at which the first parking space satisfies the parking condition and the timing at which the second parking space satisfies the parking condition is not longer than a predetermined time period, this case is assessed/evaluated as a case in which the available parking spaces are close to each other or a case in which the vehicle speed of the subject vehicle V is high, and the change of the display form of the first parking space is once prohibited to continue the display in the first display form. This allows the driver or passengers to readily select the first parking space because the time during which the first parking space is selected is prolonged.

(12) According to the parking assist apparatus 100 in one or more embodiments of the present invention, the first parking space which satisfies a predefined parking condition is displayed in the first display form on the display 21, and when it is estimated that the first parking space will not satisfy the parking condition or when it is estimated that the second parking space other than the first parking space will satisfy the parking condition, the first parking space is displayed in the second display form, which is different from the first display form, on the display 21. The above-described parking assist method/method of displaying parking assist information can be carried out using the parking assist apparatus 100 according to one or more embodiments of the present invention. The parking assist apparatus 100 according to one or more embodiments of the present invention therefore has the above-described actions and effects.

Embodiments heretofore explained are described to facilitate understanding of the present invention and are not described to limit the present invention. It is therefore intended that the elements disclosed in the above embodiments include all design changes and equivalents to fall within the technical scope of the present invention.

That is, in the present description, an example of the parking assist apparatus 100 having the control device 10 and the display 21 is described as an embodiment of the parking assist apparatus according to the present invention, but the present invention is not limited to this.

REFERENCE SIGNS LIST

1000 Parking assist system
100 Parking assist apparatus
  10 Control device
    11 CPU
    12 ROM
    13 RAM
20 Output device
21 Display
1*a*-1*d* Onboard cameras
2 Image processing device
3 Ranging device
4 Notification device
  41 Speaker
  42 Lamp
  43 Vibration generator
30 Vehicle controller
40 Drive system
50 Steering angle sensor
60 Vehicle speed sensor
  V Subject vehicle
  Me Available parking space, Parking available mark
  Mr Recommended parking space, Recommendation mark
  Mo Target parking space

The invention claimed is:

1. A method of displaying parking assist information, the method being used in a parking assist apparatus comprising a display and a control device,
comprising:
displaying by the control device a first parking space in a first display form on the display, the first parking space satisfying a parking condition that is preliminarily defined; and
in response to determining or detecting, at a current time, that the first parking space will not at a first time later than the current time satisfy the parking condition or that a second parking space other than the first parking space will at a second time later than the current time satisfy the parking condition, displaying by the control device the first parking space by a second display form different from the first display form on the display.

2. The method according to claim 1, wherein a first time from when the first parking space is displayed in the second display form to when the first parking space becomes non-displayed is set longer as a speed of a subject vehicle increases.

3. The method according to claim 1, wherein a period of a first time from when the first parking space is displayed in the second display form to when the first parking space becomes non-displayed is set such that the first time set when the first parking space and the second parking space are adjacent to each other is longer than the first time set when the first parking space and the second parking space are not adjacent to each other.

4. The method according to claim 1, further comprising:
in response to estimating that the second parking space other than the first parking space will satisfy the parking condition, displaying, by the control device, the second parking space in a third display form on the display and then displaying the second parking space in a fourth display form on the display.

5. The method according to claim 1, wherein a second time from when the second parking space is displayed in a third display form to when the second parking space is displayed in a fourth display form is set in accordance with a speed of a subject vehicle.

6. The method according to claim 4, wherein a period of a second time from when the second parking space is displayed in the third display form to when the second parking space is displayed in the fourth display form is set such that the second time set when the second parking space is adjacent to another parking space into which parking is possible is longer than the second time set when the second parking space is not adjacent to another parking space into which parking is possible.

7. The method according to claim 1, further comprising:
detecting, by the control device, available parking spaces into which parking is possible;
detecting, by the control device, a recommended parking space among the available parking spaces as the first parking space, the recommended parking space satisfying a parking recommendation condition that belongs to the parking condition; and
displaying, by the control device, the recommended parking space in the first display form.

8. The method according to claim 7, further comprising:
when the first parking space is extracted as the recommended parking space at first timing in a process of extracting the recommended parking space, extracting, by the control device, the second parking space that is not adjacent to the first parking space as the recommended parking space at second timing after the first timing.

9. The method according to claim 1, further comprising:
when the first parking space is displayed in the first display form, notifying it, by a notification device of the parking assist apparatus, in a first notification mode; and
when the first parking space is displayed in the second display form, notifying it, by the notification device, in a second notification mode different from the first notification mode.

10. The method according to claim 5,
further comprising:
when the second parking space is displayed in the third display form, notifying it, by a notification device of the parking assist apparatus, in a third notification mode; and when the second parking space is displayed in the fourth display form, notifying it, by the notification device, in a fourth notification mode different from the third notification mode.

11. The method according to claim 1, further comprising: when a time period between timing at which the first parking space satisfies the parking condition and timing at which the second parking space satisfies the parking condition is not longer than a predetermined time period, prohibiting, by the control device, a display form of the first parking space from switching from the first display form to the second display form; and continuing to display, by the control device, the first parking space in the first display form even when it is estimated that the second parking space other than the first parking space will satisfy the parking condition.

12. A parking assist apparatus comprising a display and a control device, the control device being configured to:
display a first parking space in a first display form on the display, the first parking space satisfying a parking condition that is preliminarily defined; and in response to estimating or detecting, at a current time, that the first parking space will at a first time later than the current time not satisfy the parking condition or that a second parking space other than the first parking space will at a second time later than the current time satisfy the parking condition, display the first parking space by a second display form different from the first display form on the display.

13. The method according to claim 5, wherein a period of the second time from when the second parking space is displayed in the third display form to when the second parking space is displayed in the fourth display form is set such that the second time set when the second parking space is adjacent to another parking space into which parking is possible is longer than the second time set when the second parking space is not adjacent to another parking space into which parking is possible.

14. A method of displaying parking assist information, the method being used in a parking assist apparatus comprising a display and a control device, comprising:
displaying by the control device a first parking space in a first display form on the display, the first parking space satisfying a parking condition that is preliminarily defined; and in response to estimating or detecting that the first parking space will not at a first time later than a current time satisfy the parking condition and that a second parking space other than the first parking space will at a second time later than the current time satisfy the parking condition, displaying by the control device the first parking space by a second display form different from the first display form on the display.

* * * * *